US007901283B2

(12) United States Patent
Thomas et al.

(10) Patent No.: US 7,901,283 B2
(45) **Date of Patent: *Mar. 8, 2011**

(54) BONUS GAME FOR A GAMING MACHINE

(75) Inventors: Alfred Thomas, Chicago, IL (US); Benjamin T. Gomez, Chicago, IL (US); Robert J. Wilson, Jr., Buffalo Grove, IL (US); Roger A. Delott, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 936 days.

This patent is subject to a terminal disclaimer.

(21) Appl. No.: 11/818,368

(22) Filed: Jun. 14, 2007

(65) Prior Publication Data

US 2007/0265062 A1 Nov. 15, 2007

Related U.S. Application Data

(60) Continuation of application No. 11/101,959, filed on Apr. 8, 2005, now Pat. No. 7,520,809, which is a division of application No. 10/813,099, filed on Mar. 30, 2004, now Pat. No. 6,905,412, which is a division of application No. 10/673,718, filed on Sep. 29, 2003, now abandoned, which is a continuation of application No. 09/981,203, filed on Oct. 16, 2001, now Pat. No. 6,645,074, which is a continuation of application No. 09/710,564, filed on Nov. 9, 2000, now Pat. No. 6,322,309, which is a continuation of application No. 09/127,377, filed on Jul. 31, 1998, now Pat. No. 6,190,255.

(60) Provisional application No. 60/079,143, filed on Mar. 24, 1998.

(51) Int. Cl.
*A63F 13/00* (2006.01)

(52) U.S. Cl. ................. 463/20; 463/16; 463/25; 463/29; 273/138.1; 273/138.2

(58) Field of Classification Search .................... 463/16, 463/20, 25, 29; 273/138.1, 138.2
See application file for complete search history.

(56) References Cited

U.S. PATENT DOCUMENTS 3,281,149 A 10/1966 Miller .......................... 273/143
(Continued)

FOREIGN PATENT DOCUMENTS

AU 9748484 7/1998
(Continued)

OTHER PUBLICATIONS

Product Sheet for “Monopoly SWP,” JPM Ltd., 4 pages (date unknown).

(Continued)

*Primary Examiner* — David L Lewis
*Assistant Examiner* — William H McCulloch
(74) *Attorney, Agent, or Firm* — Nixon Peabody LLP

(57) ABSTRACT

A bonus game for a slot machine operable in a basic mode and a bonus mode. The bonus game is entered upon the occurrence of a special start-bonus game outcome in the basic mode. In the bonus game, a player selects, one at a time, from an array of windows each associated with a bonus game outcome. Credits are awarded based upon which ones of the windows are selected. The bonus game ends upon selection of a window associated with an end-bonus outcome but otherwise continues, allowing the player to make further selections and accumulate further credits until encountering an end-bonus outcome. In one embodiment, a bonus game resource obtained in the basic game may be exercised in the bonus game to affect the bonus game outcome. In one embodiment, for example, where the occurrence of an end-bonus outcome would otherwise end the bonus game, a player having a bonus game resource may exercise the bonus game resource upon encountering an end-bonus outcome to continue playing the bonus game.

18 Claims, 12 Drawing Sheets

U.S. PATENT DOCUMENTS

| | | | | |
|---|---|---|---|---|
| 4,095,795 | A | 6/1978 | Saxton et al. | 273/143 R |
| 4,238,127 | A | 12/1980 | Lucero et al. | 273/143 R |
| 4,306,768 | A | 12/1981 | Egging | 350/174 |
| 4,335,809 | A | 6/1982 | Wain | 194/1 R |
| 4,448,419 | A | 5/1984 | Telnaes | 273/143 R |
| 4,508,345 | A | 4/1985 | Okada | 273/143 R |
| 4,508,513 | A | 4/1985 | Donovan | 434/346 |
| 4,560,161 | A | 12/1985 | Hamano | 273/85 CP |
| 4,624,459 | A | 11/1986 | Kaufman | 273/143 R |
| 4,721,307 | A | 1/1988 | Okada | 273/143 R |
| 4,763,256 | A | 8/1988 | DeMar | 364/410 |
| 4,772,023 | A | 9/1988 | Okada | 273/143 R |
| 4,805,907 | A | 2/1989 | Hagiwara | 273/138 A |
| 4,871,171 | A | 10/1989 | Rivero | 273/138 A |
| 5,083,785 | A | 1/1992 | Okada | 273/143 R |
| 5,092,598 | A * | 3/1992 | Kamille | 273/139 |
| 5,169,147 | A | 12/1992 | Hamano | 273/138 A |
| 5,205,555 | A | 4/1993 | Hamano | 273/143 R |
| 5,259,616 | A | 11/1993 | Bergmann | 273/138 A |
| 5,292,127 | A | 3/1994 | Kelly et al. | 273/138 R |
| 5,342,047 | A | 8/1994 | Heidel et al. | 273/85 CP |
| 5,342,049 | A | 8/1994 | Wichinsky et al. | 271/119 R |
| 5,380,008 | A | 1/1995 | Mathis et al. | 273/143 R |
| 5,393,057 | A | 2/1995 | Marnell, II | 273/85 CP |
| 5,401,024 | A | 3/1995 | Simunek | 273/138 A |
| 5,415,404 | A | 5/1995 | Joshi et al. | 273/138 A |
| 5,429,361 | A | 7/1995 | Raven et al. | 273/138 A |
| 5,449,173 | A | 9/1995 | Thomas et al. | 273/143 R |
| 5,456,465 | A | 10/1995 | Durham | 273/138 A |
| 5,542,669 | A | 8/1996 | Charron et al. | 463/13 |
| 5,547,192 | A | 8/1996 | Ishibashi | 463/26 |
| 5,624,119 | A | 4/1997 | Leake | 273/269 |
| 5,647,798 | A | 7/1997 | Falciglia | 463/19 |
| 5,664,781 | A | 9/1997 | Feola | 273/292 |
| 5,697,843 | A | 12/1997 | Manship et al. | 463/20 |
| 5,704,835 | A | 1/1998 | Dietz, II | 463/20 |
| 5,722,891 | A | 3/1998 | Inoue | 463/20 |
| 5,779,545 | A | 7/1998 | Berg et al. | 463/22 |
| 5,788,573 | A | 8/1998 | Baerlocher et al. | 463/16 |
| 5,823,874 | A | 10/1998 | Adams | 463/17 |
| 5,848,932 | A | 12/1998 | Adams | 463/20 |
| 5,855,514 | A * | 1/1999 | Kamille | 463/17 |
| 5,931,467 | A | 8/1999 | Kamille | 273/139 |
| 5,951,397 | A | 9/1999 | Dickinson | 463/36 |
| 5,980,384 | A | 11/1999 | Barrie | 463/16 |
| 5,996,997 | A * | 12/1999 | Kamille | 273/139 |
| 6,012,982 | A | 1/2000 | Piechowiak et al. | 463/16 |
| 6,015,346 | A * | 1/2000 | Bennett | 463/20 |
| 6,056,642 | A * | 5/2000 | Bennett | 463/20 |
| 6,089,976 | A | 7/2000 | Schneider et al. | 463/16 |
| 6,089,978 | A | 7/2000 | Adams | 463/20 |
| 6,102,798 | A * | 8/2000 | Bennett | 463/16 |
| 6,126,542 | A | 10/2000 | Fier | 463/16 |
| 6,135,884 | A * | 10/2000 | Hedrick et al. | 463/20 |
| 6,135,885 | A * | 10/2000 | Lermusiaux | 463/20 |
| 6,237,913 | B1 * | 5/2001 | Kamille | 273/139 |
| 6,261,177 | B1 * | 7/2001 | Bennett | 463/16 |
| 6,802,774 | B1 * | 10/2004 | Carlson et al. | 463/16 |
| 7,073,793 | B2 * | 7/2006 | Vancura | 273/274 |
| 7,585,219 | B2 * | 9/2009 | Randall et al. | 463/20 |
| 7,614,947 | B2 * | 11/2009 | Baerlocher et al. | 463/16 |
| 7,654,898 | B2 * | 2/2010 | Vancura | 463/20 |
| 7,780,511 | B2 * | 8/2010 | Casey et al. | 463/10 |
| 7,789,747 | B2 * | 9/2010 | Glavich et al. | 463/17 |
| 7,789,749 | B2 * | 9/2010 | Bansemer et al. | 463/20 |
| 7,841,936 | B2 * | 11/2010 | Berman et al. | 463/20 |
| 7,846,015 | B2 * | 12/2010 | Bansemer et al. | 463/16 |

FOREIGN PATENT DOCUMENTS

| | | |
|---|---|---|
| DE | 37 00 861 | 7/1988 |
| DE | 40 14 477 | 7/1991 |
| EP | 0 142 371 | 5/1985 |
| EP | 0 148 001 | 7/1985 |
| EP | 0 333 338 | 9/1989 |
| EP | 0 577 415 | 1/1994 |
| FR | 1 474 617 | 3/1967 |
| GB | 1129607 | 10/1968 |
| GB | 1 476 848 | 6/1977 |
| GB | 1 591 623 | 6/1981 |
| GB | 2 066 991 | 7/1981 |
| GB | 2 072 395 | 9/1981 |
| GB | 2 083 936 | 3/1982 |
| GB | 2 084 371 | 4/1982 |
| GB | 2 105560 | 8/1982 |
| GB | 2 096 376 | 10/1982 |
| GB | 2 097 160 | 10/1982 |
| GB | 2 105 891 | 3/1983 |
| GB | 2 106 685 | 4/1983 |
| GB | 2 117 952 | 10/1983 |
| GB | 2 144 644 | 3/1985 |
| GB | 2 147 442 | 5/1985 |
| GB | 2 147 773 | 5/1985 |
| GB | 2 152 262 | 7/1985 |
| GB | 2 153 572 | 8/1985 |
| GB | 2 157 047 | 10/1985 |
| GB | 2 165 385 | 4/1986 |
| GB | 2 170 636 | 8/1986 |
| GB | 2 180 087 | 3/1987 |
| GB | 2 181 589 | 4/1987 |
| GB | 2 183 882 | 6/1987 |
| GB | 2 191 030 | 12/1987 |
| GB | 2 197 974 | 6/1988 |
| GB | 2 202 984 | 10/1988 |
| GB | 2 204 436 | 11/1988 |
| GB | 2 210 191 | 6/1989 |
| GB | 2 222 712 | 3/1990 |
| GB | 2 226 907 | 7/1990 |
| GB | 2 229 565 | 9/1990 |
| GB | 2 230 373 | 10/1990 |
| GB | 2 231189 | 11/1990 |
| GB | 2 233 806 | 1/1991 |
| GB | 2 242 300 | 9/1991 |
| GB | 2 253 154 | 9/1992 |
| GB | 2 262 642 | 6/1993 |
| GB | 2 270 787 | 3/1994 |
| GB | 2 271262 | 4/1994 |
| GB | 2 273 384 | 8/1994 |
| GB | 2 287 567 | 9/1995 |
| GB | 2 297 857 | 8/1996 |
| GB | 2 298 508 | 9/1996 |
| WO | WO 88/08179 | 10/1988 |
| WO | WO 89/12875 | 12/1989 |
| WO | WO 92/10818 | 6/1992 |
| WO | WO 94/01840 | 1/1994 |
| WO | WO 97/27569 | 7/1997 |
| WO | WO 98/09259 | 3/1998 |

PUBLICATIONS

Product Sheet for “Big Money,” WMS Gaming Inc., 1 page (date unknown).
Product Sheet for “Piggy Bankin’,” WMS Gaming Inc., 1 page (date unknown).
Product Sheet for “Pirate’s Thunder,” WMS Gaming Inc., 1 page (date unknown).
Bally Circus Advertisement for excerpt from “Lemons, Cherries and Bell Fruit Gum,” Richard M. Bueschel, 2 pages (date unknown).
Bally Bingo Advertisement for excerpt from “Lemons, Cherries and Bell Fruit Gum,” Richard M. Bueschel, 2 pages (date unknown).
Las Vegas Slot Machine Advertisement for excerpt from “Lemons, Cherries and Bell Fruit Gum,” Richard M. Bueschel, 2 pages (date unknown).
Website Publication for “Phantom Haus,” Williams Electronics Games, Inc., 2 pages (date unknown).
Product Sheet for “Kaleidoscope,” Williams Electronics Games, Inc., 3 pages (date unknown).
Product Sheet for “Double Wild & Loose,” Williams Electronics Games, Inc., 3 pages (date unknown).
Advertisement for “Club Vegas,” Barcrest, 1 page (date unknown).
Advertisement for “Viva Club Vegas!,” Barcrest, 1 page (date unknown).
Advertisement for “Monopoly: Maygay There for the Taking,” 2 pages (date unknown).
Advertisement for “Midas Touch,” 2 pages (date unknown).

Advertisement for "Acropolis," Automatic (Fruit) Designs, Ltd., 2 pages (date unknown).
Advertisement for "Adders & Ladders," Barcrest, 2 pages (date unknown).
Advertisement for "The Wild West," Bell-Fruit Manufacturing, 2 pages (date unknown).
Advertisement for "Premier Club Manager," Bell-Fruit Manufacturing, 2 pages (date unknown).
Advertisement for "Fortune Wheel," Project Customer Services, 2 pages (date unknown).
Advertisement for "Road Hog," Barcrest, 2 pages (date unknown).
Advertisement for "Viva! Six! Las Vegas," Barcrest, 2 pages (date unknown).
Advertisement for "Golden Circle," Delta Automaten, 1 page (date unknown).
Advertisement for "Club Double," M-D-M Coin Sales Ltd., 2 pages (date unknown).
Advertisement for "Treasure Island," American Alpha, Inc., 1 page (date unknown).
Advertisement for "Bonus Card," Andries Robert Automatic s.p.r.l., 1 page (date unknown).
Advertisement for "Super Square," Maygay Machines Ltd., 2 pages (date unknown).
Advertisement for "Lucky Bank," 1 page (date unknown).
Advertisement for "Happy Clown," Andries Robert Automatic s.p.r. l., 1 page (date unknown).
Advertisement for "Jackpot Stampede," WMS Gaming Inc., 2 pages (date unknown).
Brochure for "Perfect Universal Slot Machines," Universal Co., Ltd., 16 pages (date unknown).
Advertisement for "Club Make a Million," Bell-Fruit Manufacturing Co., Ltd., 2 pages (date unknown).
Advertisement for "Instant Jackpots," Bell-Fruit Manufacturing Co., Ltd., 2 pages (date unknown).
Advertisement for Barcrest Limited, 1 page (date unknown).
Cover page for "Covers Your World," Euroslot. The Currency of the Coin Machine Industry, 1 page (date unknown).
Advertisement for "Only Fools and Horses," Bell-Fruit Manufacturing Co., Ltd., 2 pages (date unknown).
Advertisement for "Main Attraction," Bell-Fruit Manufacturing Co., Ltd., 2 pages (date unknown).
Brochure for "World Players," Barcrest, 6 pages (date unknown).
Brochure for "JPM Presents Monopoly Deluxe," JPM International Ltd., 5 pages (date unknown).
Advertisement for "Colossus," AFD, 1 page (date unknown).
Advertisement for "Wheel of Fortune," Project Creating Entertainment, 2 pages (date unknown).
Advertisement for "Lucky Horseshoes," JPM Automatic Machines Ltd., 2 pages (date unknown).
Advertisement for "Lucky Jackpots," JPM Automatic Machines Ltd., 2 pages (date unknown).
Advertisement for "Monopoly," JPM Automatic Machines Ltd., 2 pages (date unknown).
Advertisement for "The Big Breakfast," Channel Four Television Corporation, 2 pages (1993).
Product Sheet for 5 Coin Joker Poker, Aristocrat Leisure Industries Pty Ltd., 2 pages (Sep. 1993).
Article titled "Bangkok on the Brink," Euroslot. The International Coin-Operated Machine Journal, 2 pages (Nov. 1993).
Product Sheet for "Treasure," Aristocrat Leisure Industries, 2 pages (1994).
Brochure for "The 50th Show," Ate International, 2 pages (Jan. 1994).
Product Sheet for "Top Gear," Aristocrat Leisure Industries, 2 pages (Feb. 1994).
Product Sheet for "Wizard Ways," Aristocrat Leisure Industries, 2 pages (Feb. 1994).
Cover page, "Enter Disposable Gaming," Euroslot. The International Coin-Operated Machine Journal, 1 page (Apr. 1994).
Article titled "Scandinavia on the Brink of the EU melting pot," Euroslot. The International Coin-Operated Machine Journal, 2 pages (Aug. 1994).
Product Sheet for "Wild Cherry (120A)," International Game Technology, 2 pages (Nov. 7, 1994).
Product Sheet for "Double Wild Cherry (195A)," International Game Technology, 3 pages (Nov. 7, 1994).
Product Sheet for "Prize Winner," Pacific Gaming Pty Limited, 2 pages (1995).
Description and Photos of Poker Plus, Bally, 6 pages (1995).
Chapters 10, 11 & 12, excerpts from "Lemons, Cherries and Bell-Fruit-Gum," Richard M. Bueschel, 71 pages (1995).
Product Sheet for "Reel 'Em In™," WMS Gaming Inc., 4 pages (1997).
Product Sheet for "Reel 'Em In™," WMS Gaming Inc., 2 pages (1997).
Product Sheet for "Mermaid's Gold," WMS Gaming Inc., 2 pages (1997).
Website Publication for "Arabian Riches," Silicon Gaming Inc., 2 pages (Jul. 17, 1998).
Website Publication for "Buccaneer Gold," Silicon Gaming Inc., 2 pages (Jul. 17, 1998).
Website Publication for "Fort Knox," Silicon Gaming Inc., 2 pages (Jul. 17, 1998).
Website Publication for "Lady of Fortune," Silicon Gaming Inc., 2 pages (Jul. 17, 1998).
Website Publication for "Riddle of the Sphinx," Silicon Gaming Inc., 2 pages (Jul. 17, 1998).
Product Sheet for "Great Whites," 2 pages (2000).
Defendant Sigma Game, Inc.'s Opposition to Plaintiff's Motion for a Preliminary Injunction (with Exhibits A-F), *WMS Gaming, Inc.* v. *Sigma Game, Inc.*, United States District Court, District of Nevada, CV-S04-0027-RLH-LRL (Mar. 22, 2004).
Defendant Sigma Game, Inc.'s Supplement to Opposition to Plaintiff's Motion for a Preliminary Injunction (with Exhibits A-C), *WMS Gaming, Inc.* v. *Sigma Game, Inc.*, United States District Court, District of Nevada, CV-S04-0027-RLH-LRL (Mar. 23, 2004).
Declaration of Michael Eide in Support of Defendant, Sigma Game, Inc.'s Opposition to Plaintiff, WMS Gaming, Inc.'s Motion for Preliminary Injunction (with Exhibit 1), *WMS Gaming, Inc.* v. *Sigma Game, Inc.*, United States District Court, District of Nevada, CV-S04-0027-RLH-LRL (Mar. 18, 2004).
Declaration of Dustin Fasbender in Support of Defendant, Sigma Game, Inc.'s Opposition to Plaintiff, WMS Gaming, Inc.'s Motion for Preliminary Injunction, *WMS Gaming, Inc.* v. *Sigma Game, Inc.*, United States District Court, District of Nevada, CV-S04-0027-RLH-LRL (Mar. 19, 2004).
Declaration of Marvin Hein in Support of Defendant, Sigma Game, Inc.'s Opposition to Plaintiff, WMS Gaming, Inc.'s Motion for Preliminary Injunction (with Exhibits 1-4), *WMS Gaming, Inc.* v. *Sigma Game, Inc.*, United States District Court, District of Nevada, CV-S04-0027-RLH-LRL (Mar. 19, 2004).
Declaration of James Jackson in Support of Defendant, Sigma Game, Inc.'s Opposition to Plaintiff, WMS Gaming, Inc.'s Motion for Preliminary Injunction (with videotape SGI-009421 listed in ¶13), *WMS Gaming, Inc.* v. *Sigma Game, Inc.*, United States District Court, District of Nevada, CV-S04-0027-RLH-LRL (Mar. 22, 2004).
Declaration of David Kraft in Support of Defendant, Sigma Game, Inc.'s Opposition to Plaintiff, WMS Gaming, Inc.'s Motion for Preliminary Injunction (with Exhibits 1-6), *WMS Gaming, Inc.* v. *Sigma Game, Inc.*, United States District Court, District of Nevada, CV-S04-0027-RLH-LRL (Mar. 18, 2004).
Declaration of Brent Lang in Support of Defendant, Sigma Game, Inc.'s Opposition to Plaintiff, WMS Gaming, Inc.'s Motion for Preliminary Injunction, *WMS Gaming, Inc.* v. *Sigma Game, Inc.*, United States District Court, District of Nevada, CV-S04-0027-RLH-LRL (Mar. 19, 2004).
Declaration of John O'Donovan in Support of Defendant, Sigma Game, Inc.'s Opposition to Plaintiff, WMS Gaming, Inc.'s Motion for Preliminary Injunction, *WMS Gaming, Inc.* v. *Sigma Game, Inc.*, United States District Court, District of Nevada, CV-S04-0027-RLH-LRL (Mar. 19, 2004).
"3 Bags Full", Aristocrat Leisure Industries, Copyright 1995, (2 pages).

"Bring Home the Bacon", Aristocrat Leisure Industries, Copyright 1996, (2 pages).
"Dream Weaver", Aristocrat Leisure Industries, Copyright 1997, (2 pages).
"Magic Touch", Aristocrat Leisure Industries, Copyright Feb. 1998, (2 pages).
"Mine Mine Mine", Aristocrat Leisure Industries, Copyright 1996, (2 pages).
"Winning Wolf", Pacific Gaming Pty. Limited, Copyright 1996, (2 pages).

* cited by examiner

| | PAY LINE 1 | PAY LINE 2 | PAY LINE 3 | PAY LINE 4 | PAY LINE 5 |
|---|---|---|---|---|---|
| | 100 | 200 | 300 | 400 | 1000 |
| | 80 | 80 | 80 | 80 | 80 |
| ANY THREE MIXED | 40 | 40 | 40 | 40 | 40 |
| | 30 | 30 | 30 | 30 | 30 |
| | 20 | 20 | 20 | 20 | 20 |
| | 20 | 20 | 20 | 20 | 20 |
| | 15 | 15 | 15 | 15 | 15 |
| | 10 | 10 | 10 | 10 | 10 |
| | 5 | 5 | 5 | 5 | 5 |
| | 5 | 5 | 5 | 5 | 5 |
| | 2 | 2 | 2 | 2 | 2 |
| | 2 | 2 | 2 | 2 | 2 |

MATH TABLE - 1 COIN "BASIC" GAME

| PAY COMBO | # PER REEL | | | HITS | PULLS/ HIT | PROBABILITY | PAYS | EXPECTED VALUE | TOTAL PAY | CONTRIBUTIO N |
|---|---|---|---|---|---|---|---|---|---|---|
| CH -- -- | 1 | 16 | 18 | 288 | 20.25 | 0.049383 | 2 | 0.098766 | 576 | 0.172869 |
| ST -- -- | 1 | 16 | 18 | 288 | 20.25 | 0.049383 | 2 | 0.098766 | 576 | 0.172869 |
| CH CH -- | 1 | 2 | 16 | 32 | 182.25 | 0.005487 | 5 | 0.027435 | 160 | 0.048019 |
| ST ST -- | 1 | 2 | 17 | 34 | 171.5294 | 0.00583 | 5 | 0.02915 | 170 | 0.05102 |
| OR OR OR | 6 | 1 | 5 | 30 | 194.4 | 0.005144 | 10 | 0.05144 | 300 | 0.090036 |
| PL PL PL | 5 | 2 | 3 | 30 | 194.4 | 0.005144 | 15 | 0.07716 | 450 | 0.135054 |
| CH CH CH | 1 | 2 | 2 | 4 | 1458 | 0.000686 | 20 | 0.01372 | 80 | 0.02401 |
| ST ST ST | 1 | 2 | 1 | 2 | 2916 | 0.000343 | 20 | 0.00686 | 40 | 0.012005 |
| BE BE BE | 1 | 6 | 2 | 12 | 486 | 0.002058 | 30 | 0.06174 | 360 | 0.108043 |
| A7 A7 A7 | 3 | 2 | 2 | 9 | 648 | 0.001543 | 40 | 0.06172 | 360 | 0.108043 |
| B7 B7 B7 | 2 | 1 | 1 | 2 | 2916 | 0.000343 | 80 | 0.02744 | 160 | 0.048019 |
| J7 J7 J7 | 1 | 1 | 1 | 1 | 5832 | 0.000171 | 100 | 0.0171 | 100 | 0.030012 |
| TOTAL | | | | 732 | 7.97 | 0.1255 = 12.55% | | .57133 = 57.133% | 3332 | |

FIG. 4

PAYOUT SUMMARY - BASIC GAME ONLY

| COIN # | % PAYOUT | HIT % | TOTAL HITS | TOTAL COINS PAID |
|---|---|---|---|---|
| 1 | 57.13306 | 12.55144 | 732 | 3332 |
| 2 | 57.9904 | 25.10288 | 1464 | 6764 |
| 3 | 58.84774 | 37.65432 | 2196 | 10296 |
| 4 | 59.70508 | 50.20576 | 2928 | 13928 |
| 5 | 62.27709 | 62.7572 | 3660 | 18160 |

*FIG. 5*

MATH TABLE - "S1ART-BONUS" COMBINATION (1 COIN GAME)

| PAY COMBO | # PER REEL | | | HITS | PULLS/ HIT | PROBABILITY | EXPECTED PAY | EXPECTED VALUE | EXPECTED TOTAL PAY |
|---|---|---|---|---|---|---|---|---|---|
| FV FV FV | 3 | 9 | 3 | 81 | 72 | 0.013889 | 20.57152 | 0.2857 | 1666.293 |
| J7 OR SL | 1 | 1 | 1 | 1 | 5832 | 0.000171 | 20.57152 | 0.00352 | 20.57152 |
| BOTH COMBINATIONS | | | | 82 | 71.12195 | 0.01406 | 20.57152 | 0.2892 | 1686.865 |

*FIG. 6*

PAYOUT SUMMARY - BONUS FEATURE INCLUDED WITH BASE GAME

| COIN # | % PAYOUT | HIT % | TOTAL HITS | TOTAL COINS PAID | NORMALIZED AVERAGE BONUS |
|---|---|---|---|---|---|
| 1 | 86.05732 | 13.95748 | 814 | 5018.863 | 20.5715 |
| 2 | 86.11125 | 26.50892 | 1546 | 10044.02 | 20.0001 |
| 3 | 86.16518 | 39.06036 | 2278 | 15075.46 | 19.4287 |
| 4 | 86.01819 | 51.6118 | 3010 | 20066.32 | 18.7144 |
| 5 | 86.17998 | 64.16324 | 3742 | 25130.08 | 17.0002 |

FIG. 7

NON-END-BONUS WINDOW VALUES (NORMALIZED)

| WINDOW # | 1 CN VAL | 2 CN VAL | 3 CN VAL | 4 CN VAL | 5 CN VAL |
|---|---|---|---|---|---|
| 0 | 1 | 1 | 1 | 1 | 1 |
| 1 | 5 | 5 | 5 | 5 | 2 |
| 2 | 3 | 3 | 3 | 3 | 3 |
| 3 | 4 | 4 | 4 | 4 | 4 |
| 4 | 5 | 3 | 2 | 2 | 2 |
| 5 | 5 | 5 | 5 | 2 | 2 |
| 6 | 5 | 5 | 5 | 5 | 4 |
| 7 | 4 | 4 | 5 | 5 | 5 |
| 8 | 2 | 3 | 2 | 4 | 3 |
| 9 | 3 | 2 | 2 | 2 | 2 |
| 10 | 5 | 5 | 5 | 5 | 10 |
| 11 | 10 | 10 | 10 | 10 | 10 |
| 12 | 15 | 15 | 15 | 15 | 15 |
| 13 | 20 | 20 | 20 | 20 | 20 |
| 14 | 1 | 1 | 1 | 1 | 1 |
| 15 | 5 | 5 | 5 | 5 | 5 |
| 16 | 2 | 2 | 2 | 2 | 2 |
| 17 | 10 | 10 | 10 | 10 | 3 |
| 18 | 15 | 15 | 10 | 10 | 5 |
| 19 | 5 | 4 | 5 | 2 | 2 |
| 20 | 3 | 2 | 3 | 2 | 2 |
| 21 | 2 | 2 | 2 | 2 | 2 |
| 22 | 2 | 2 | 2 | 2 | 2 |
| 23 | 5 | 5 | 5 | 5 | 5 |
| Total from non-end-bonus windows | 137 | 133 | 129 | 124 | 112 |
| Average non-end-bonus | 5.70833 | 5.541667 | 5.375 | 5.166667 | 4.666667 |

FIG. 10

BONUS GAME OUTCOME SUMMARY

| CHOICE | % END | % SAFE | PAYS | EV CALCULATION |
|---|---|---|---|---|
| 0 | 0.2 | 1.0 | 1 | 1 |
| 1 | 0.165517 | 0.8 | 6.70833 | 5.566664 |
| 2 | 0.135961 | 0.634483 | 12.41666 | 9.188501 |
| 3 | 0.110783 | 0.498522 | 18.12499 | 12.03423 |
| 4 | 0.089478 | 0.387739 | 23.83332 | 14.24757 |
| 5 | 0.071583 | 0.298261 | 29.54165 | 15.95015 |
| 6 | 0.05667 | 0.226678 | 35.24998 | 17.2441 |
| 7 | 0.04435 | 0.170009 | 40.95831 | 18.21457 |
| 8 | 0.034271 | 0.125659 | 46.66664 | 18.93187 |
| 9 | 0.026111 | 0.091388 | 52.37497 | 19.45354 |
| 10 | 0.019583 | 0.065277 | 58.0833 | 19.82617 |
| 11 | 0.01443 | 0.045694 | 63.79163 | 20.08701 |
| 12 | 0.010421 | 0.031264 | 69.49996 | 20.26547 |
| 13 | 0.007356 | 0.020843 | 75.20829 | 20.38445 |
| 14 | 0.005057 | 0.013487 | 80.91662 | 20.46144 |
| 15 | 0.003372 | 0.008429 | 86.62495 | 20.50955 |
| 16 | 0.002167 | 0.005057 | 92.33328 | 20.53842 |
| 17 | 0.001334 | 0.00289 | 98.04161 | 20.55492 |
| 18 | 0.000778 | 0.001556 | 103.7499 | 20.5638 |
| 19 | 0.000424 | 0.000778 | 109.4583 | 20.56824 |
| 20 | 0.000212 | 0.000354 | 115.1666 | 20.57026 |
| 21 | 9.43E-05 | 0.000141 | 120.8749 | 20.57107 |
| 22 | 3.54E-05 | 4.72E-05 | 126.5833 | 20.57134 |
| 23 | 1.01E-05 | 1.18E-05 | 132.2916 | 20.57141 |
| 24 | 1.68E-06 | 1.68E-06 | 200 | 20.57152 |
| EXPECTED VALUE FOR 1 COIN BONUS GAME: 20.57152 | | | | |

*FIG. 11*

BONUS GAME FOR A GAMING MACHINE

CROSS REFERENCE TO RELATED APPLICATIONS

This application is a continuation of U.S. patent application Ser. No. 11/101,959, filed Apr. 8, 2005, now U.S. Pat. No. 7,520,809; which is a divisional of U.S. patent application Ser. No. 10/813,099, filed Mar. 30, 2004, and issued as U.S. Pat. No. 6,905,412 on Jun. 14, 2005; which is a divisional of U.S. patent application Ser. No. 10/673,718, filed Sep. 29, 2003, now abandoned; which is a continuation of U.S. patent application Ser. No. 09/981,203, filed Oct. 16, 2001, and issued as U.S. Pat. No. 6,645,074 on Nov. 11, 2003; which is a continuation of U.S. patent application Ser. No. 09/710,564, filed Nov. 9, 2000, and issued as U.S. Pat. No. 6,322,309 on Nov. 27, 2001; which is a continuation of U.S. patent application Ser. No. 09/127,377, filed Jul. 31, 1998, and issued as U.S. Pat. No. 6,190,255 on Feb. 20, 2001; which claims the benefit of priority of U.S. Provisional Patent Application No. 60/079,143, filed Mar. 24, 1998, all of which are hereby incorporated by reference in their entirety.

FIELD OF THE INVENTION

The present invention relates generally to gaming machines and, more particularly, to a bonus mode play feature for a gaming machine.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available, because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept which has been successfully employed to enhance the entertainment value of a game is the concept of a “secondary” or “bonus” game which may be played in conjunction with a “basic” game. The bonus game may comprise any type of game, either similar to or completely different from the basic game, which is entered upon the occurrence of a selected event or outcome of the basic game. The bonus game concept is the subject of U.S. patent application Ser. No. 08/835,840 [hereinafter “the ’840 application”], filed Apr. 23, 1997, assigned to the assignee of the present invention and incorporated herein by reference. The ’840 application discloses an embodiment wherein the basic game is a reel-type slot machine and the bonus game is a simulated reel-type slot machine implemented on a dot-matrix display. The bonus game is entered upon the appearance of a special symbol combination on the reels of the slot machine in the basic game. In the bonus game, the probability of winning combinations appearing on the reels, or the “hit rate,” is much greater than that of the basic game. The player is permitted to keep playing and accumulating winnings from the bonus game until a losing trial occurs. Such a bonus game produces a significantly higher level of player excitement than the basic game because it provides a greater expectation of winning than the basic game and is accompanied with more attractive or unusual video displays and/or audio.

Because the bonus game concept offers tremendous advantages in player appeal and excitement relative to other known games, and because such games are attractive to both players and operators, there is a continuing need to develop new types of bonus games to satisfy the demands of players and operators. Preferably, such new bonus games will maintain, or even further enhance, the level of player excitement offered by bonus games heretofore known in the art. The present invention is directed to satisfying these needs.

SUMMARY OF THE INVENTION

In accordance with one aspect of the present invention, there is provided a gaming machine including a processor operable in a basic mode and a bonus mode for controlling game play. In the basic mode, the processor operates to select a basic game outcome from among a plurality of possible basic game outcomes. The possible basic game outcomes include a start-bonus outcome the occurrence of which causes the processor to shift operation from the basic mode to the bonus mode. The processor is operable to define a plurality of player-selectable bonus game outcomes. In the bonus mode, a player selects one or more of the bonus game outcomes and credits are awarded based upon which ones of the bonus game outcomes are selected.

In accordance with another aspect of the present invention, there is provided a gaming machine including a processor operable to selecting a game outcome from among a number of possible game outcomes. A number of the possible game outcomes are identifiable according to a pay table as winning combinations, whereas a remaining number of the possible game outcomes are identified as apparent losing combinations. The gaming machine includes means for awarding credits upon occurrences of the winning combinations and upon occurrence of at least one of the apparent losing combinations.

In accordance with yet another aspect of the present invention, there is provided a gaming machine including a processor operable in a basic mode and a bonus mode for controlling game play. In the basic mode, the processor operates to select a basic game outcome from among a plurality of possible basic game outcomes. The possible basic game outcomes include one or more bonus-resource outcomes the occurrence of which causes the processor to generate a bonus game resource exercisable in a bonus game. The gaming machine includes means for shifting operation of the processor from the basic mode to the bonus mode. The processor is operable to define a plurality of possible bonus game outcomes. In the bonus mode, upon selection of a bonus game outcome, the bonus game resource(s) generated in the basic game may be exercised to affect the bonus game outcome. In one embodiment, where the bonus game outcome would otherwise cause the processor to end the bonus game, an exercise of a bonus game resource in conjunction with the bonus game outcome causes the processor to continue operation in the bonus mode, thereby allowing the player to continue playing the bonus game.

BRIEF DESCRIPTION OF THE DRAWINGS

The foregoing and other advantages of the invention will become apparent upon reading the following detailed description and upon reference to the drawings in which:

FIG. 4 is a math table corresponding to the symbol combinations identified in FIG. 3 with one coin played;

FIG. 5 is a payout summary table for a basic game using the reel strips of FIG. 2 with one to five coins played;

FIG. 6 is a math table for various "start-bonus" symbol combinations which may occur in a basic game using the reel strips of FIG. 2 with one coin played;

FIG. 7 is a payout summary table for a combined basic and bonus game using the reel strips of FIG. 2 with one to five coins played;

FIG. 10 is a table illustrating window values which may appear in a bonus game corresponding to various numbers of coins played;

FIG. 11 is a table summarizing various possible outcomes of a bonus game according to one embodiment of the present invention;

Figure 1:
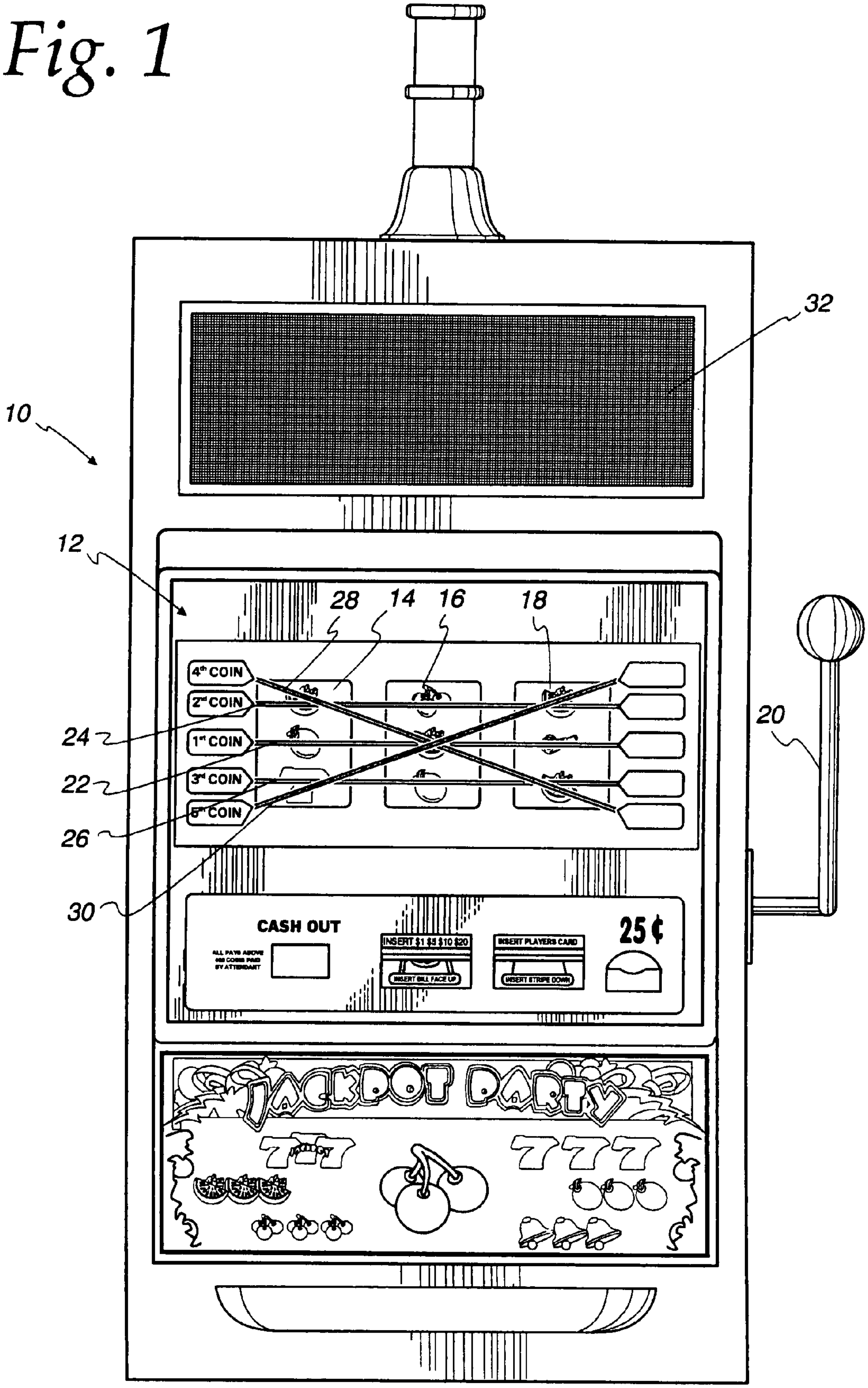
FIG. 1 is a simplified illustration of a spinning reel slot machine with dot matrix display on which the present invention may be implemented.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a slot machine 10 which may be utilized to play both a "basic" game and a secondary or "bonus" game. The slot machine 10 includes a display window 12 through which a player may observe three spinning reels, 14, 16 and 18. Game play is initiated by inserting a number of coins or playing a number of credits, causing a CPU or game controller (not shown) to activate a number of pay lines corresponding to the number of coins or credits played. In the illustrated embodiment, up to five paylines, designated by reference numerals 22, 24, 26, 28 and 30 may be activated, depending on the number of coins or credits played. The play of one coin or credit activates pay line 22, two coins or credits activate pay lines 22 and 24, three coins or credits activate pay lines 22, 24 and 26, four coins or credits activate pay lines 22, 24, 26 and 28 and five coins or credits activate pay lines 22, 24, 26, 28 and 30. It will be appreciated, however, that the present invention may be implemented on machines having fewer or greater numbers of paylines and/or with payline(s) which are activated independently of the number of coins or credits played. The present invention may also be implemented with video "reels." Accordingly, the terms "reels," "spinning reels," etc., and the like shall be understood herein to encompass video, as well as mechanical, implementations.

After activation of the paylines, the reels 14, 16, 18 are set in motion by either pulling a lever 20 or depressing a push button (not shown) on the slot machine 10. The processor then operates according to its game program to select a game outcome (e.g., "basic" game outcome) corresponding to a particular set of reel stop positions and, using technology well known in the art, causes each of the reels 14, 16, 18 to stop at the preselected stop position. Symbols (see FIG. 2) are affixed to the reels 14, 16, 18 to graphically illustrate the reel stop position and indicate whether the stop position of the reels represent a winning game outcome. Winning "basic" game outcomes (e.g., symbol combinations resulting in payment of coins or credits) are identifiable by a pay table (see FIG. 3) affixed to the slot machine 10. A winning combination occurs when the symbols appearing on the reels 14, 16, 18 correspond to one of the winning combinations on the pay table. Traditionally, such winning combinations must be displayed relative to an active one of the payline(s) 22, 24, 26, 28 and/or 30.

For example, in the illustrated embodiment, if one coin or credit is played, payline 22 is activated and a winning combination occurs if one of the combinations appearing on the pay table is displayed directly under payline 22 (e.g., with the first, second and third symbols of the combination being displayed, respectively, in the "left-center" position, "middle-center" position and "right-center" position relative to the display window 12). If two coins or credits are played, paylines 22 and 24 are activated and winning combination(s) occur if any of the combinations appearing on the pay table are displayed directly under payline 22 and/or payline 24. Payline 24 requires that the first, second and third symbols of the combination are displayed, respectively, in the "left-upper" position, "middle-upper" position and "right-upper" position relative to the display window 12. If three coins or credits are played, paylines 22, 24 and 26 are activated and winning combination(s) occur if any of the combinations appearing on the pay table are displayed directly under paylines 22, 24 and/or 26. Payline 26 requires that the first, second and third symbols of the combination are displayed, respectively, in the "left-lower" position, "middle-lower" position and "right-lower" position relative to the display window 12. If four coins or credits are played, paylines 22, 24, 26 and 28 are activated and winning combination(s) occur if any of the combinations appearing on the pay table are displayed directly under paylines 22, 24, 26 and/or 28. Payline 28 requires that the first, second and third symbols of the combination are displayed, respectively, in the "left-upper" position, "middle-center" position and "right-lower" position relative to the display window 12. Finally, if five coins or credits are played, paylines 22, 24, 26, 28 and 30 are activated and winning combination(s) occur if any of the combinations appearing on the pay table are displayed directly under paylines 22, 24, 26, 28 and/or 30. Payline 30 requires that the first, second and third symbols of the combination are displayed, respectively, in the "left-lower" position, "middle-center" position and "right-upper" position relative to the display window 12.

It will be appreciated, however, that alternative pay schemes may implemented. For example, a winning combination may be defined by the processor to occur when a special "start-bonus" symbol appears on one or more of the reels in any predetermined display position. In one embodiment of the present invention, a "start-bonus" outcome occurs when a special "start-bonus" symbol appears on each of three reels, in either of three visible display positions (e.g., "upper," "center" or "lower") on each reel, even if such positions do not correspond with an active pay line. The appearance of a "start-bonus" symbol on the designated number of reels, in the designated display position(s) represents a "start-bonus" outcome causing the processor to shift operation from the basic game to a bonus game. In another embodiment, the processor enters the bonus game upon the appearance of a special symbol combination on the reels 14, 16, 18 which is not identified on the pay table. Because such combination is not identified on the pay table, it is a "start-bonus" combination which players will consider to be a losing combination and, accordingly, represents a surprise winning combination to the player. Alternatively or additionally, the occurrence of "start-bonus" symbols and/or combination(s) may cause the processor to award coin(s) or credit(s) in the basic game.

A video display 32 is provided for displaying the bonus game. The video display 32 may comprise a dot matrix, CRT, LED, LCD, electro-luminescent display or generally any type of video display known in the art. In the illustrated embodiment, the video display 32 is vertically disposed within an upper portion of the slot machine 10. It will be appreciated that the "basic" game need not comprise a spinning reel slot machine game, as illustrated in FIG. 1, but may comprise virtually any type of game of chance or skill or combination of such games) having outcomes (e.g., "start-bonus" outcomes) which may trigger play of a bonus game on the video display 32. The basic game may itself be implemented on the video display 32 or a separate video display (not shown). The basic game may comprise a video poker or video blackjack game, for example. In embodiments where both the basic and bonus games are implemented in video, each game may be shown on the same video display.

In one embodiment, the possible basic game outcomes include a special symbol combination (e.g., "bonus-resource" outcome) causing the processor to generate a bonus game resource exercisable in the bonus game. The occurrence of "bonus-resource" outcome(s) may also cause the processor to award coin(s) or credit(s) in the basic game. In one embodiment, the processor continues to operate in the basic mode after the occurrence of a bonus-resource outcome. In this embodiment, any number of bonus-resource outcomes may occur through several repetitions of the basic game (causing the processor to generate a corresponding number of bonus game resources) before entering the bonus mode, if at all, upon the occurrence of a start-bonus outcome. The bonus game resource(s) may comprise any item which operates to enhance the excitement and/or winning expectation in the bonus game. In one embodiment, for example, a bonus game resource is usable to override an otherwise undesired outcome of the bonus game. For example, in a bonus game including one or more "end-bonus" outcome(s) which would otherwise end the bonus game, a bonus game resource, if available, may be used to override the end-bonus outcome and thereby continue play of the bonus game. Another type of bonus game resource might be used as a multiplier (e.g., 2×, 5×, 10×, etc.) of coin(s) or credit(s) awarded in a bonus game. For example, a "5×" resource played in conjunction with a bonus game outcome awarding 5 coins or credits would result in an award of 25 coins or credits.

Figure 2:
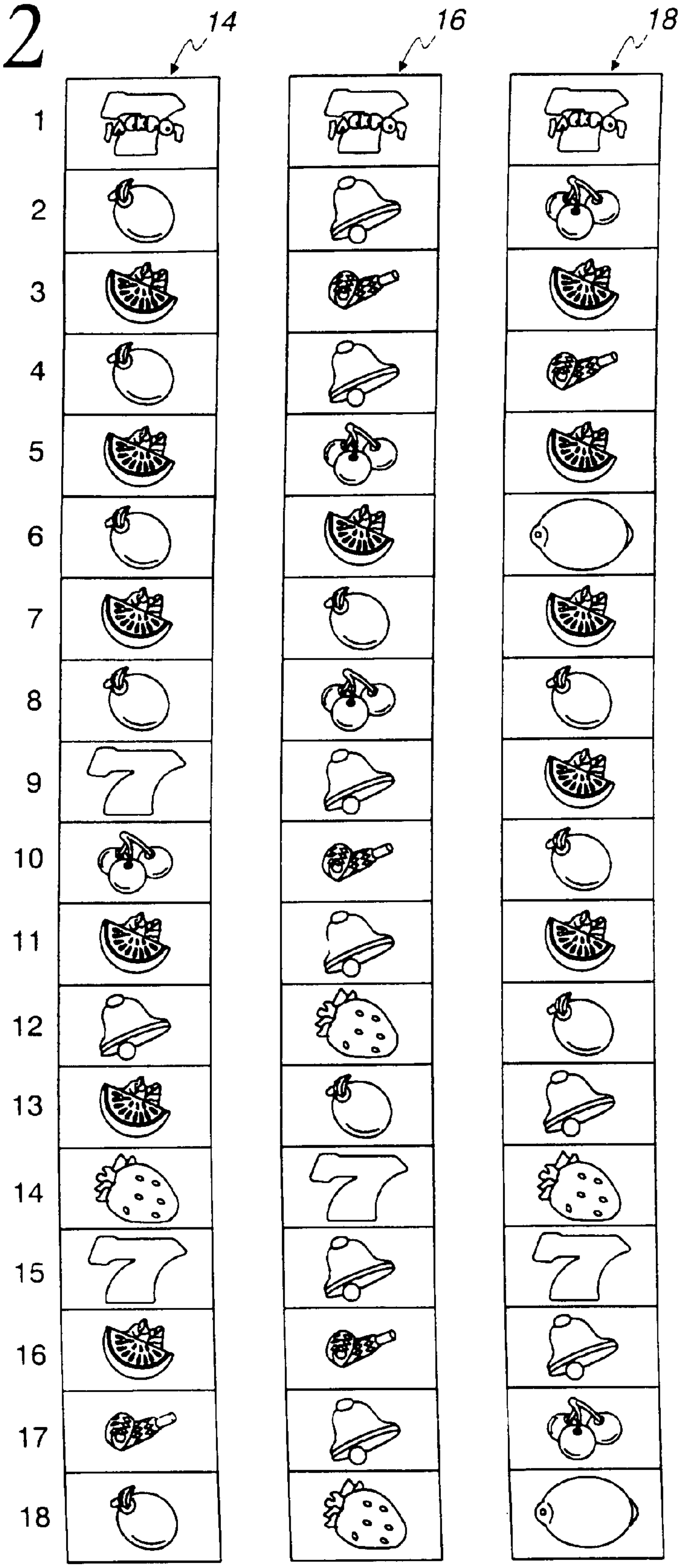
FIG. 2 is an illustration of three reel strips which may be placed on the reels of the slot machine of FIG. 1 to implement a basic slot machine game according to one embodiment of the present invention.

FIG. 2 shows a set of reel strips for use with a slot machine of the type shown in FIG. 1 to implement a JACKPOT PARTY™ slot machine game, assigned to the assignee of the present invention. The reel strips correspond to the reels 14, 16, 18 in FIG. 1 and will be identified by corresponding reference numerals 14, 16, 18. Each of the reel strips 14, 16, 18 include eighteen symbols, corresponding to eighteen available reel stopping positions. The symbols which appear on reel strip 14 include, in sequence, Jackpot 7, Plum, Orange, Plum, Orange, Plum, Orange, Plum, Blue 7, Cherry, Orange, Bell, Orange, Strawberry, Blue 7, Orange, Party Favor and Plum. The symbols which appear on reel strip 16 include, in sequence, Jackpot 7, Bell, Party Favor, Bell, Cherry, Orange, Plum, Cherry, Bell, Party Favor, Bell, Strawberry, Plum, Blue 7, Bell, Party Favor, Bell and Strawberry. Finally, the symbols which appear on reel strip 18 include, in sequence, Jackpot 7, Cherry, Orange, Party Favor, Orange, Special Lemon, Orange, Plum, Orange, Plum, Orange, Plum, Bell, Strawberry, Blue 7, Bell, Cherry and Lemon.

Figure 3:
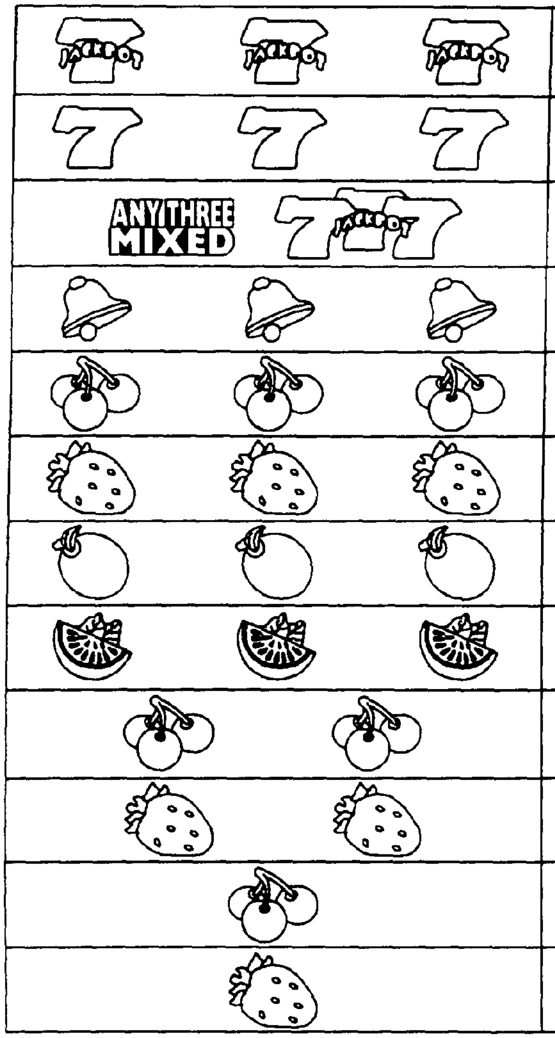
FIG. 3 is a pay table for various symbol combinations which may occur in a basic game using the reel strips of FIG. 2.

A pay table for the JACKPOT PARTY™ slot machine game (corresponding to the symbols shown in FIG. 2) is shown at FIG. 3. The pay table identifies the amount of coin(s) or credit(s) awarded for various combinations of symbols that may appear in the basic game. The amount of coin(s) or credit(s) identified in the pay table traditionally corresponds to the probabilities of "hitting" the various combinations of symbols, less an appropriate "hold percentage" retained by the slot machine 10.

FIG. 4 is a pay table identifying mathematical probabilities and expected values in a basic game with 1 coin or credit played (with only payline 22 activated). In FIG. 4, the "PAY COMBO" column identifies the various winning combinations (corresponding to the pay table of FIG. 3) that may occur in the basic portion of the JACKPOT PARTY™ slot machine game. The "# PER REEL" columns indicate, respectively, the number(s) of reel positions on reels 14, 16, 18 that will support the various winning combinations for a 1-coin game. In the CH CH CH symbol combination, for example, because Cherry symbols occupy 1 position on the first reel, 2 positions on the second reel and 2 positions on the third reel, and because there is only one active payline in a 1-coin game, there are 1, 2 and 2 positions, respectively, that will support the CH CH CH combination. The "Hits" column identifies, for each combination of symbols, the product of the three "# PER REEL" columns and represents the number(s) of times the winning combinations can occur, given the number(s) of reel positions of the various symbols and the number of active paylines. Thus, for the CH CH CH symbol combination in a 1-coin game, the "Hits" value is 4 (i.e., 1×2×2). The "Total Hits" value (i.e. 732) is the sum of the various "Hits" values in a 1-coin game.

Where the reels each have eighteen symbols corresponding to eighteen reel stop positions, as in the JACKPOT PARTY™ game, the odds of "hitting" each unique combination relative to a single active payline is one in 5,832 (18×18×18). The "Pulls/Hit" column of FIG. 4 identifies, on average, the number of pulls that would be required to "hit" each respective symbol combination in a 1-coin game. For example, there is only one unique symbol combination out of 5,832 possible symbol combinations that would result in a J7 J7 J7 outcome. Thus, it would take 5,832 pulls, on average, to "hit" the J7 J7 J7 combination in a 1-coin game. Similarly, there are 30 unique symbol combinations out of 5,832 possible symbol combinations that would result in either an "OR OR OR" or "PL PL PL" combination. Thus, it would take 194.4 pulls, on average, (i.e., 5,832÷30) to "hit" the "OR OR OR" or "PL PL PL" combination in a 1-coin game. The "Pulls/Hit" value at the bottom of the column represents the number of pulls, on average, that would be required to hit any of the winning combinations in a 1-coin game, computed by dividing number of possible symbol combinations (5,832) by the "Total Hits" value (732).

The "Probability" column indicates the various probabilities of hitting the respective winning combinations in a single spin. This is computed by taking the inverse of the "Pulls/Hit" values. The "Hit Rate" value at the bottom of the column represents the probability of hitting any winning combination in a single spin.

The "Pays" column of FIG. 4 lists the pay values of the respective winning outcomes, corresponding to the Pay Table of FIG. 3 for a 1-coin game. The "E.V." column identifies the expected values of the respective winning outcomes, computed for each outcome by taking the product of the "Pays" value and the "Probability" value. Thus, for the CH—combination, the expected value is 0.098766 (2×0.049383). The "Payout Rate" of the basic game, identified at the bottom of the "E.V." column, is computed by summing each of the expected values. Thus, for a 1-coin game, the payout rate is 0.57133 or 57.133%.

The "Total Pay" column lists, for each winning outcome, the product of the "Hits" value and the "Pays" value. The CH CH CH combination, for example, having 4 hits each paying 20 coins or credits, has a "Total Pay" value of 80 coins or credits. "Total Coins Paid" is the sum of the various "Total Pay" amounts and equals 3,332 total coins for a 1-coin game. The "Contribution" column indicates, for a 1-coin game, the percentage contribution of the respective "Total Pay" amounts to the total coins or credits payed. Thus, for example, for the CH CH CH combination, the contribution is 0.02401 (100÷3,332).

As will be appreciated, modification of FIG. 4 to reflect a 2-coin, 3-coin, 4-coin or 5-coin game may be easily accomplished by those skilled in the art. Accordingly, such modification will not be accomplished herein. Suffice it to say that the 2-coin, 3-coin, 4-coin and 5-coin games have, respectively 2, 3, 4 and 5 active paylines and thus the "Hits," "Total Hits" and "Hit Rate" values will increase in proportion to the number of active paylines. The "Pays" values for the J7 J7 J7 combination will increase to 200, 300, 400 and 1,000 coins, respectively, depending on the numbers of coins played. The increased pay values for the J7 J7 J7 combination causes the "Payout Rate" value to increase based on the number of coins played and causes the "Total Coins Paid" value to increase in a proportion greater than the number of active paylines.

A summary of the various payout rates, hit rates, total hits and total coins paid for the basic game with different numbers of coins played is set forth in FIG. 5. It can be seen in FIG. 5 that, in the basic game, there is a 5.144% difference (62.27709−57.13306) between the payout percentage of the 1-coin game and the 5-coin game. Under Nevada law, multi-coin games may not yield a spread of hold percentages (or payout percentages) which vary greater than 4% for different numbers of coins played without special metering. Because the difference in the basic game exceeds 4%, an adjustment is desirable in the bonus game to lower the hold percentage of the 5-coin game relative to the 1-coin game. This adjustment will be described later in relation to FIG. 7.

The information provided in FIG. 4 and FIG. 5 corresponds to the basic JACKPOT PARTY™ game using the reel strips of FIG. 2 and does not factor in winning outcomes associated with the JACKPOT PARTY™ bonus game. According to principles of the present invention, there are various basic game outcomes (e.g., special symbol combinations) which cause the processor to shift operation from the basic game to a bonus game. In the JACKPOT PARTY™ game, one such combination is characterized by the display of a "Party Favor" symbol (see FIG. 2) on each reel, causing the processor to enter a bonus game "party." Another special combination is characterized by the display of respective Jackpot 7, Orange and Special Lemon symbols on reels 14, 16, 18, also causing the processor to enter a bonus game "party." Both of these special symbol combinations represent a "start-bonus" outcome because they cause the processor to shift operation from the basic game to a bonus game. The bonus game party entered in response to the Jackpot 7, Orange and Special Lemon combination is a "surprise party" because, since the Jackpot 7, Orange and Special Lemon symbols are not identified to the player (e.g., on the pay table) as winning combinations, it is an apparent losing combination and would not be expected to generate a bonus game and associated high winning expectation.

FIG. 6 identifies mathematical probabilities and expected values associated with the special "start-bonus" outcomes in a 1-coin JACKPOT PARTY™ game. For the FV FV FV (i.e., three party favor) symbol combination, the "# PER REEL" columns of FIG. 6 indicate that there are 3, 9 and 3 reel positions that will support the combination. This is because there are 1,3 and 1 party favor symbols on each respective reel and they may be displayed in any of three display positions. The FV FV FV combination will "hit" 81 times (3×9×3), which equates to 72 pulls per hit (5,832÷81) or a probability of 0.013889 (1÷72). Because there are no predetermined pay values associated with the bonus game, the "Expected Pay" values do not represent expected payment amounts per se, but rather identify an average pay amount which may be expected in the bonus game. The average pay amount is dependent on the various possible outcomes of the bonus game. (A detailed description of the bonus game is provided in relation to FIG. 11). For a 1-coin game, with the bonus game outcomes identified in FIG. 11, the expected pay for a bonus game is 20.57152 coins or credits.

Therefore, the total expected pay of the FV FV FV outcome in a 1-coin game is 1666.293 (81×20.57152). The expected value of the bonus game resulting from the FV FV FV combination is 0.2857 (0.013889×20.57152).

For the "surprise" J7 OR SL combination (i.e., Jackpot 7, Orange, Special Lemon) symbol combination, the respective J7, OR and SL symbols occupy only one unique position on each reel. This is because the J7 OR SL combination is programmed by the processor to trigger the bonus game only when the "surprise" combination is aligned on the center payline. The J7 OR SL combination will therefore "hit" only 1 time (1×1×1), which equates to 5,832 pulls per hit (5,832÷1) or a probability of 0.000171 (1÷5,832). For a 1-coin game, the expected pay of the bonus game is 20.57152 coins and, therefore, the total expected pay of the J7 OR SL outcome is 20.57152 (1×20.57152). The expected value of the bonus game resulting from the J7 OR SL combination is 0.0035 (0.000171×20.57152).

For both types of parties combined (e.g., for the FV FV FV and J7 OR SL combinations combined), there are 82 "hits" (81+1), which equates to 71.12195 pulls per hit (5,832÷82) or a probability of 0.01406 (1÷71.12195). The total expected pay of the FV FV FV and J7 OR SL outcomes combined (for a 1-coin game) is 1686.865 (1666.293+20.57152) and the contribution to expected value (for a 1-coin game) is 0.2892 (0.2857+0.0035). This value is added to the payout percentage of the basic game to determine the payout percentage of basic game and bonus game combined. For a 1-coin game, the payout percentage of the basic game and bonus game combined is 86.05732% (0.57133+0.2892).

For 2-coin, 3-coin, 4-coin and 5-coin bonus games, the "# PER REEL," "Hits," "Pulls/Hit" and "Probability" values will remain the same for each "start-bonus" outcome as in the 1-coin game. This is because, in contrast to the basic game, there is no increase in the number of active paylines for increased numbers of coins. Thus, the FV FV FV combination will trigger play of the bonus game, independent of the number of coins played, whenever party favor symbols are displayed in any of three display positions of the slot machine 10. Similarly, the J7 OR SL combination will trigger play of the bonus game, independent of the number of coins played, when it is displayed on the center payline 22 of the slot machine 10. The "Expected Pay" values for the bonus game will increase roughly in proportion to the number of coins played but, to maintain appropriate payout percentages for the combination of basic and bonus games, must be adjusted slightly downward as the number of coins played is increased so as to counterbalance the relatively high payout percentages of the basic game. More specifically, as discussed in relation to FIG. 5, there is a 5.144% difference in payout percentages between the 1-coin and 5-coin "basic" game. Because this difference exceeds 4%, it is desirable to adjust the bonus game payout percentages to lower the hold percentage of the 5-coin game relative to the 1-coin game. This may be accomplished by reducing the "Expected Pay" amount in the 5-coin bonus game so that the spread of hold percentages for the basic game and bonus games combined is within the 4% criterion. In one embodiment, bonus game "Expected Pay" amounts are adjusted for each number of coins played so that every number of coins played will yield a payout percentage of about 86%.

FIG. 7 summarizes the various payout percentages, hit rates, total hits and total coins paid for the basic games and bonus games combined as a function of numbers of coins played. It can be seen in FIG. 7 that the hold percentage of the combined basic and bonus game varies between a maximum of 86.17998% (for a 5-coin game) to a minimum of 86.01819 (for a 4-coin game), thus presenting a spread of only 0.16%, which is well within the 4% criterion. FIG. 7 also shows normalized "Average Bonus" values for the 1-coin, 2-coin, 3-coin, 4-coin and 5-coin bonus games necessary to produce the desired hold percentages. It can be seen that the normalized average bonus decreases in relation to the number of coins played, from a maximum of 20.5715 (in a 1-coin game) to a minimum of 17.0002 (for a 5-coin game). "Actual" bonus values for the respective games may be computed by simply multiplying the normalized values by the number of coins played. Thus, for example, in a 5-coin game, the average bonus game will award 85 coins (17.0002×5).

Figure 8:
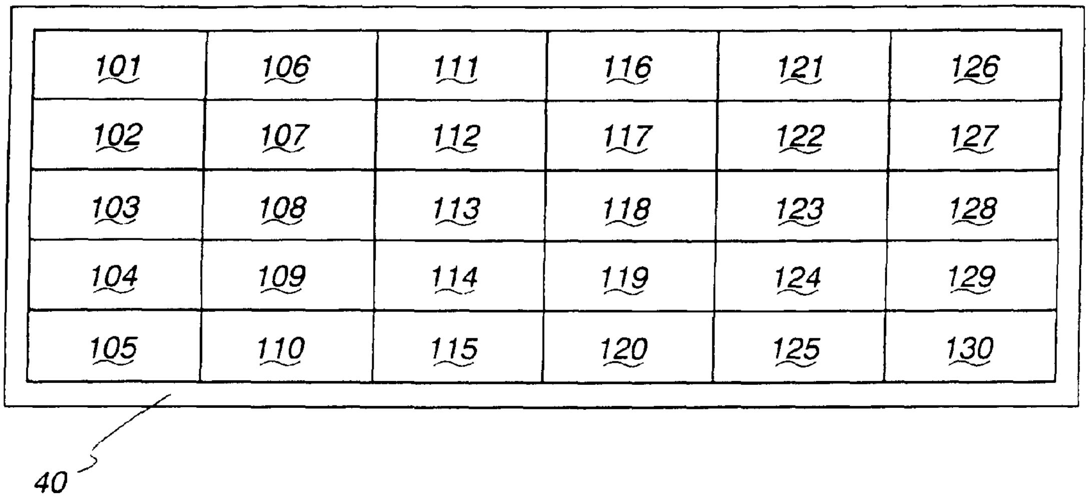
FIG. 8 illustrates a display which appears upon initial play of a bonus game according to one embodiment of the present invention.
Figure 9:
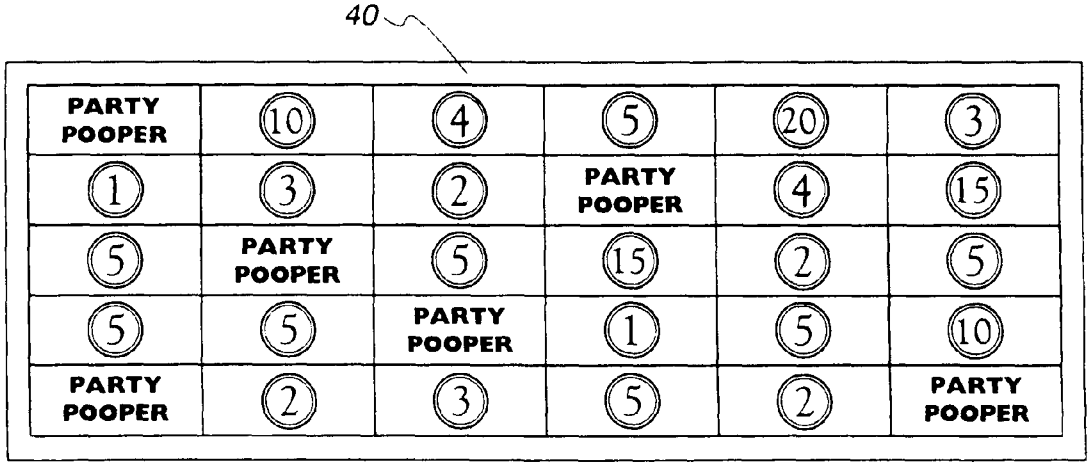
FIG. 9 illustrates a display which may appear upon completion of a bonus game according to one embodiment of the present invention.

FIGS. 8 and 9 illustrate various aspects of a bonus game according to the present invention. In one embodiment, the bonus game is implemented on a display 32 of the type shown in FIG. 1 in conjunction with a spinning reel slot machine. It will be appreciated, however, that the bonus game may also be implemented in conjunction with basic games other than spinning reel slot machines and/or with alternative forms of video displays.

FIG. 8 illustrates a rectangular grid 40 that appears on the display 32 upon initial play of the bonus game. In one embodiment, the grid 40 consists of thirty "tiles" arranged in five rows and six columns. Each of the tiles comprises a selection element or "window" associated with a particular bonus game outcome. The tiles/windows, identified in FIG. 8 by respective reference numerals 101 through 130, are initially masked as shown in FIG. 8 so that the various outcomes corresponding to the windows are hidden "behind" the windows. In one embodiment, the outcomes consist of various numerical outcomes (such as, for example, coin/credit values) and various non-numerical outcomes (such as, for example, "end-bonus" outcomes). The various type(s) of outcomes and the values of the numerical outcomes are predetermined by the game program according to the type of bonus game which is being played (and, in one embodiment, according to the number of coins or credits played) but the placement of the outcomes in the grid (e.g., the determination of which selection elements are to be associated with the various outcomes) is randomly determined by the game controller. Arrangement of the various outcomes, once determined, remains fixed for the duration of the bonus game. The arrangement of outcomes is reaccomplished, however, upon subsequent plays of the bonus game so that each individual bonus game will generally have a unique arrangement of outcomes in the grid 40. It will be appreciated that the depiction and arrangement of selection elements, the number(s) of selection elements and the distribution of possible outcomes associated with the selection elements may be varied according to the game program. For example, the selection elements may be depicted as graphical symbols, animations, and the like rather than "windows," and may be provided in fewer or greater numbers than described herein.

As play begins, the player is prompted to select one of the thirty windows 101 through 130. It will be appreciated that any of several known player control devices may be utilized to implement the selection of window(s). In one embodiment, an animated "hand" pointer scrolls across the grid and window selection is accomplished by the player depressing a designated "select" button when the hand is pointing to a desired selection. Scrolling of the pointer (e.g., hand) prior to the selection of the desired window may be accomplished automatically according to the game program or may be controlled by the player depressing various buttons. In another embodiment utilizing a touch-screen display, the desired window is selected by simply touching the screen in an area over the window. The selection of selection element(s) under player control is a novel concept which enhances the excitement of the bonus game in relation to other types of bonus games known in the art. Whereas other bonus game(s) have outcomes which are determined entirely by the game program, the outcome(s) in the present game are directly influenced by the player's choice(s) of window(s).

Upon selection of a selection element, the game controller causes the outcome associated with the selected selection element to be revealed on the display 32. Coin(s) or credit(s) are awarded as appropriate, corresponding to the selected outcome. The award of coin(s) or credit(s) may occur immediately upon selection of the outcome or may be deferred until completion of the bonus game. As an example, suppose that the outcomes corresponding to windows 101 through 130 are as shown in FIG. 9. In this case, selection of window 106 will cause the game controller to reveal the outcome associated with window 106, which is a coin with a value of 10 units. Unselected windows (which in the present example would be windows 101-105 and 107-130) remain masked so as to continue to "hide" their respective outcomes.

In an embodiment including "end-bonus" outcomes (e.g., the PARTY POOPER symbol in FIG. 9), the selection of an end-bonus outcome causes the game controller to end the bonus game. Otherwise, the selection of any other outcome causes the controller to prompt the player to make other selection(s), one at a time, until an end-bonus outcome is selected. Thus, continuing the present example, suppose that after having chosen window 106 for the first selection, a player chooses window 117 for his/her second selection. Selection of window 117 will cause the game controller to reveal the outcome associated with window 117, which in the present example is a PARTY POOPER symbol, causing the controller to end the bonus game. Otherwise, if instead of window 117 (or any other PARTY POOPER window), the player had chosen window 116 (or any other non-PARTY POOPER window), the controller would have displayed the outcome associated with the selected window and prompted the player to make another selection. This process continues for each successive selection until an end-bonus outcome is selected.

In one embodiment, the outcomes corresponding to windows 101 through 130 of the grid 40 are based on the MONOPOLY™ board game. MONOPOLY™ is a trademark of Hasbro, Inc. and Hasbro International, Inc., Pawtucket, R.I., used with permission by the assignee of the present invention. In this embodiment, the outcomes corresponding to windows 101 through 130 may include, for example, properties (e.g., Boardwalk, Park Place, etc.), utilities (e.g., Water Works, etc.), railroads (e.g., Short Line, B & O Railroad, etc.), and various end-bonus outcomes (e.g., "GO TO JAIL" squares). In the MONOPOLY™ game, as in the JACKPOT PARTY™ game, the selection of an end-bonus outcome causes the game controller to end the bonus game. Otherwise, the selection of any other outcome causes the controller to award coin(s) or credit(s) corresponding to the selected outcome, and then the player is prompted to make other selection(s), one at a time, until an end-bonus outcome is selected.

Thus, in the MONOPOLY™ game, a player could perhaps select Boardwalk for the first selection, Marvin Gardens for the second selection, Short Line Railroad for the third selection, and so on until selecting a "GO TO JAIL" square. Coin(s) or credit(s) are awarded upon the selection of each property in much the same manner as the selection of coin symbols in the JACKPOT PARTY™ game, with the exception that supplemental coin(s) or credit(s) are awarded in the MONOPOLY™ game if the property selection "completes" a particular color group (e.g., yellow, red, green, blue, etc.) or property type group (e.g., railroads or utilities). The various property color groups and type groups are substantially identical to those in the MONOPOLY™ game and will not be described in detail herein. The supplemental coin(s) or credit(s) awarded upon completion of a group may comprise a predefined amount or a multiplier of the cumulative individual outcomes in the group. More specifically, suppose that the selection of Boardwalk is worth 50 coins or credits and the selection of Park Place is worth 40 coins or credits. If a player were to select both Boardwalk and Park Place in the bonus game and thereby complete the "blue" property group, such selection might produce a supplemental award of 90 coin(s) or credit(s), in addition to the individual awards of 50 coins for Boardwalk and 40 coins for Park Place. The completion of any other color group or type group will similarly result in a supplemental award appropriate to the particular group, as defined in the game program. It will be appreciated that any of several alternative pay schemes may be implemented in the game program.

In one embodiment, upon selection of an end-bonus outcome (e.g., "GO TO JAIL" square), the player is permitted to exercise or "play" a bonus game resource, if such resource has been obtained in the basic game, to overcome an end-bonus outcome and continue play of the bonus game. If no such bonus resources are available, the bonus game is ended upon the selection of an end-bonus outcome. In the MONOPOLY™ game, for example, selection of a "GO TO JAIL" square will ordinarily end the bonus game. If, however, a bonus game resource such as a "GET OUT OF JAIL FREE" card has been obtained, the player may exercise or "play" the "GET OUT OF JAIL FREE" card to overcome selection of a "GO TO JAIL" square, and thereby continue playing the bonus game. In one embodiment, the "GET OUT OF JAIL FREE" card is obtained in a basic slot machine game upon the occurrence of one or more CHANCE symbols displayed on the reels of a slot machine, in much the same manner as in the MONOPOLY™ board game. If a player has obtained a "GET OUT OF JAIL FREE" outcome during play of the basic game, that outcome is stored in game memory and may be exercised in the bonus game according to the game program to continue play of the bonus game despite the selection of the "GO TO JAIL" symbol. Exercise of the bonus game resource, if available, may be accomplished automatically by the game controller or in response to player input.

In one embodiment, when the bonus game has ended, the game program causes the display to reveal the outcomes associated with the entire grid 40, thereby permitting the player to see which ones of the remaining windows contained end-bonus outcomes and which ones of the windows contained "safe" outcomes such as the award of coin(s) or credit(s). FIG. 9 is an example of a bonus game display with each outcome revealed. The outcomes in the display of FIG. 9 are associated with the JACKPOT PARTY™ bonus game. In the JACKPOT PARTY™ game, 24 of the tiles are associated with an award of coin(s) or credit(s) and 6 of the tiles are associated with end-bonus outcome. The tiles associated with the award of coin(s) or credit(s) are designated in FIG. 9 by an animated "coin" symbol with the amount of the award identified on the face of the coin. The tiles associated with end-bonus outcomes are designated by a PARTY POOPER symbol. As noted above, the particular arrangement of the tiles is unique to each play of the bonus game. Thus, for example, the particular arrangement of FIG. 9, with PARTY POOPER symbols displayed in windows 101, 105, 108, 114, 117 and 130, is not likely to be repeated in any other bonus game.

In one embodiment, after displaying the entire grid for a few seconds, the game controller causes the display to restore the screen to show only the selected windows, then pays out the win total associated with the selected windows. The win total in the JACKPOT PARTY™ bonus game is the sum of the selected "coin" symbol awards plus one coin (in a 1-coin game) for the PARTY POOPER symbol. The PARTY POOPER symbol will result in an award 2 coins, 3 coins, 4 coins and 5 coins, respectively, in a 2-coin, 3-coin, 4-coin and 5-coin game. The award of coin(s) for the PARTY POOPER symbol assures a winning outcome in the bonus game even if the PARTY POOPER symbol is the first (and last) selection in the game. After payment of the award, the display screen in one embodiment will display an attract mode animation until the next bonus game is commenced.

In one embodiment, the win amounts associated with the various windows are varied depending on the number of coins played to adjust the payout percentages of the game. In the JACKPOT PARTY™ game, for example, as discussed in relation to FIG. 7, the normalized win amounts in the bonus game must be reduced as the number of coins played is increased. This is accomplished by reducing the normalized win amounts available in the individual "windows" as the number of coins played is increased.

FIG. 10 identifies the various normalized win amounts available in the 1-coin, 2-coin, 3-coin, 4-coin and 5-coin JACKPOT PARTY™ bonus games. The left hand column of FIG. 10 identifies 24 "windows," numbered consecutively from 0 to 23, that are available to contain win amounts after the six PARTY POOPER tiles have been assigned to the grid. These 24 "windows" do not correspond to any specific windows in the grid 40 (FIG. 8) but will vary for each play of the bonus game depending on which windows contain the PARTY POOPER tiles. The five remaining columns identify the the normalized win amounts available in the 1-coin, 2-coin, 3-coin, 4-coin and 5-coin JACKPOT PARTY™ bonus games. The actual win amounts available for the various games may be computed by multiplying the respective normalized win amounts by the number of coins played. Thus, for example, the actual win amounts associated with the 2-coin game are 2 times that of the normalized win amounts, the actual win amounts associated with the 3-coin game are 3 times that of the normalized win amounts, and so on.

In one embodiment, the average (non end-bonus) window value for a 1-coin game is 5.70833 and the average (normalized, non end-bonus) window values for 2-coin, 3-coin, 4-coin and 5-coin games is 5.541667, 5.375, 5.166667 and 4.666667, respectively. For a 1-coin game, the specific window values are 1 (2 occurrences), 2 (4 occurrences), 3 (3 occurrences), 4 (2 occurrences), 5 (8 occurrences), 10 (2 occurrences), 15 (2 occurrences) and 20 (1 occurrence). For a 2-coin game, the specific normalized window values are 1 (2 occurrences), 2 (5 occurrences), 3 (3 occurrences), 4 (3 occurrences), 5 (6 occurrences), 10 (2 occurrences), 15 (2 occurrences) and 20 (1 occurrence). For a 3-coin game, the normalized window values are 1 (2 occurrences), 2 (6 occurrences), 3 (2 occurrences), 4 (1 occurrence), 5 (8 occurrences), 10 (3 occurrences), 15 (1 occurrence) and 20 (1 occurrence). For a 4-coin game, the normalized window values are 1 (2 occurrences), 2 (8 occurrences), 3 (1 occurrence), 4 (2 occurrences), 5 (6 occurrences), 10 (3 occurrences), 15 (1 occurrence) and 20 (1 occurrence). Finally, for a 5-coin game, the normalized window values are 1 (2 occurrences), 2 (9 occurrences), 3 (3 occurrences), 4 (2 occurrences), 5 (4 occurrences), 10 (2 occurrences), 15 (1 occurrence) and 20 (1 occurrence).

For any given number of coins played from 1 to 5, the corresponding set of win amounts are randomly assigned to non-POOPER windows and are available for selection in the bonus game. Arrangement of the various win amounts, once determined, remains fixed for the duration of the bonus game. The arrangement of win amounts and POOPER windows is reaccomplished, however, upon subsequent plays of the bonus game so that each individual bonus game will generally have a unique arrangement of outcomes in the grid.

FIG. 11 summarizes the various possible outcomes of the JACKPOT PARTY™ bonus game. The minimum possible number of successful choices is 0 (e.g., where the 1st selection is a PARTY POOPER tile). Where 24 out of the 30 windows contain win amounts and the remaining six windows contain PARTY POOPER tiles, the maximum number of successful choices that may be made in the bonus game is 24 (e.g., 24 consecutive win amounts, with the 25th selection being a PARTY POOPER tile). The entries in the left hand column ("CHOICE") of FIG. 11 are numbered consecutively from 0 to 24 and correspond to the various possible numbers of successful choices. CHOICE 0, for example, corresponds to no successful choices (e.g., where the 1st selection is a PARTY POOPER tile), CHOICE 1 corresponds to one successful choice (e.g., where the 1st selection is a win amount and the 2nd selection is a PARTY POOPER tile), and so on until reaching CHOICE 24, which corresponds to 24 successful choices (e.g., where the first 24 selections are win amounts and the 25th selection is a PARTY POOPER tile).

The "% end" column in FIG. 11 indicates the a priori probability of each particular choice resulting in an end-bonus outcome, whereas the "% safe" column indicates the probability of even reaching that particular choice (e.g., the probability that the preceding choices will not have resulted in an end-bonus outcome). The "% end" value for any particular choice number is computed by multiplying the probability of reaching that choice (e.g., the "% safe" value for that choice) by the probability that that particular choice, once reached, will result in an end-bonus outcome (e.g., the number of end-bonus outcomes divided by the number of remaining unchosen windows). For the first choice (CHOICE 0), there is a 100% probability of reaching that choice because every bonus game includes at least one choice. The "% safe" value for CHOICE 0 is therefore 1.0. The probability that the first choice will result in an end-bonus outcome is 0.2 (six end-bonus outcomes divided by 30 available window choices). The "% end" figure for CHOICE 0 is therefore 0.2 (1×0.2).

The "% safe" value of each consecutive choice is the "% safe" value of the last choice minus the "% end" value of the last choice. Thus, the "% safe" value of CHOICE 1 is 0.8 (the "% safe" value of CHOICE 0 (1.0) minus the "% end" value of CHOICE 0 (0.2)). The probability that the second choice, once reached, will result in an end-bonus outcome is 0.20689 (six end-bonus outcomes divided by 29 remaining window choices). The "% end" value for CHOICE 1 is therefore 0.165517 (0.8×0.20689) and the "% safe" value for the third choice (CHOICE 2) is 0.634483 (0.8−165517). The "% end" and "% safe" values for each of the remaining 24 successful choices are computed in similar fashion.

The "Pays" column in FIG. 11 identifies the various cumulative pay values associated with each successive choice, on average, in a 1-coin game. Where there are no successful choices (CHOICE 0), the "Pay" value is 1 because the selection of a PARTY POOPER tile results in payment of 1 coin or credit. The "Pay" value for any other number of successful choices (other than CHOICE 24) is computed by multiplying the choice number by the average window value, then adding the value of the PARTY POOPER tile. Thus, for example, in a 1-coin game with one successful choice (CHOICE 1), the "Pay" value is 6.70833 (average window value of 5.70833 plus 1 for the PARTY POOPER tile). Upon reaching CHOICE 24, a bonus of 67.7 coins, on average (in a 1-coin game) is added to the previous "Pay" value, thereby causing the cumulative pay to be 200 coins in a 1-coin game.

The "EV" column in FIG. 11 identifies various intermediate values associated with each successive choice which leads to computation of an overall expected value for a 1-coin game. The expected value for any particular choice number is not represented by the EV value in FIG. 11 but rather is represented by the "Pays" column of FIG. 11. Thus, for example, the expected value of a 1-coin game with 8 successful choices is 46.66664 (the "Pay" value associated with CHOICE 8). The expected value of the entire game, however, is 20.57152, the value at the bottom of the "EV" column. The EV value for CHOICE 0 is 1. The next consecutive EV values are computed by the formula EV=(%SAFE)×(Pay−Previous Pay)+previous EV. Thus, for example, the EV value associated with CHOICE 1 is 0.8×(6.70833−1)+1=5.566664, and so on. The EV value associated with CHOICE 24, which is the EV value for the entire game, is 1.68E−06×(199.9999−132.2916)+20.57141=20.57152.

For 2-coin, 3-coin, 4-coin or 5-coin games, the numbers of choices, "% end" and "% safe" values will be identical to that of FIG. 11 but the "Pays" and "EV" values will differ because of the different average window values and different PARTY POOPER values of the multi-coin games. Computation of these values is relatively straightforward and may be easily accomplished by those skilled in the art with the information provided herein for the 1-coin game.

It will be appreciated that the information provided in FIGS. 4-7 and FIGS. 9-11 is unique to one particular embodiment of the JACKPOT PARTY™ bonus game but the present invention is neither limited to the JACKPOT PARTY™ bonus game nor to a particular embodiment of the JACKPOT PARTY™ game. On the contrary, the bonus game according to the present invention may be implemented with other types of games and/or with other embodiments of the JACKPOT PARTY™ game which may include, for example, different number(s) of windows, different number(s) of coin-award window(s) and/or end-bonus outcome(s), different values (or different average value) of coin awards, different payback percentages, etc. The present invention may also be implemented with bonus-resource outcomes, as described above in relation to the MONOPOLY™ game.

Figure 12:
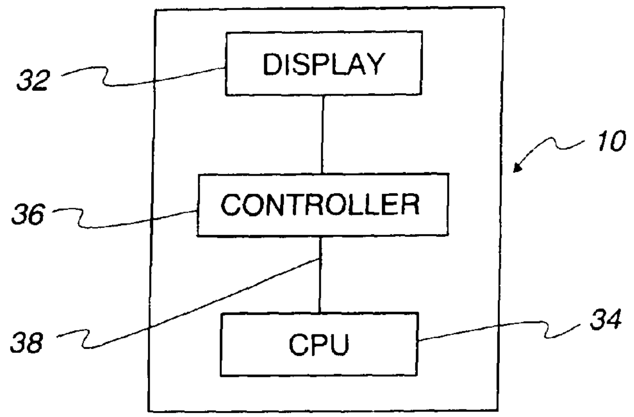
FIG. 12 is a block diagram of the slot machine of FIG. 1 illustrating a CPU and display controller.

FIG. 12 is a block diagram of a gaming machine 10 (e.g., slot machine) including a CPU 34, video display controller 36 and a local video display 32. The CPU 34 sends program information to the display controller 36 via data cable(s) 38. The data cable(s) 38, which may comprise RS-232 cables or the equivalent, support bi-directional communication between the CPU 34 and the display controller 36 at a rate of 9600 baud, or approximately 1,000 bytes every second. The program information includes operating commands for controlling the video display 32 of the gaming machine 10 and game activity commands for specifying modes of operation of the gaming machine 10 (e.g., instructing the gaming machine 10 to operate in "basic" or "bonus" mode).

The display commands include packetized graphics instructions which specify, for example, frame animations, sprite animations, text printing and text banners to be displayed by the video display 32 in either a "basic" game or "bonus" game. The display controller 36 executes the video operating instructions to operate the video display 32.

Figure 13:
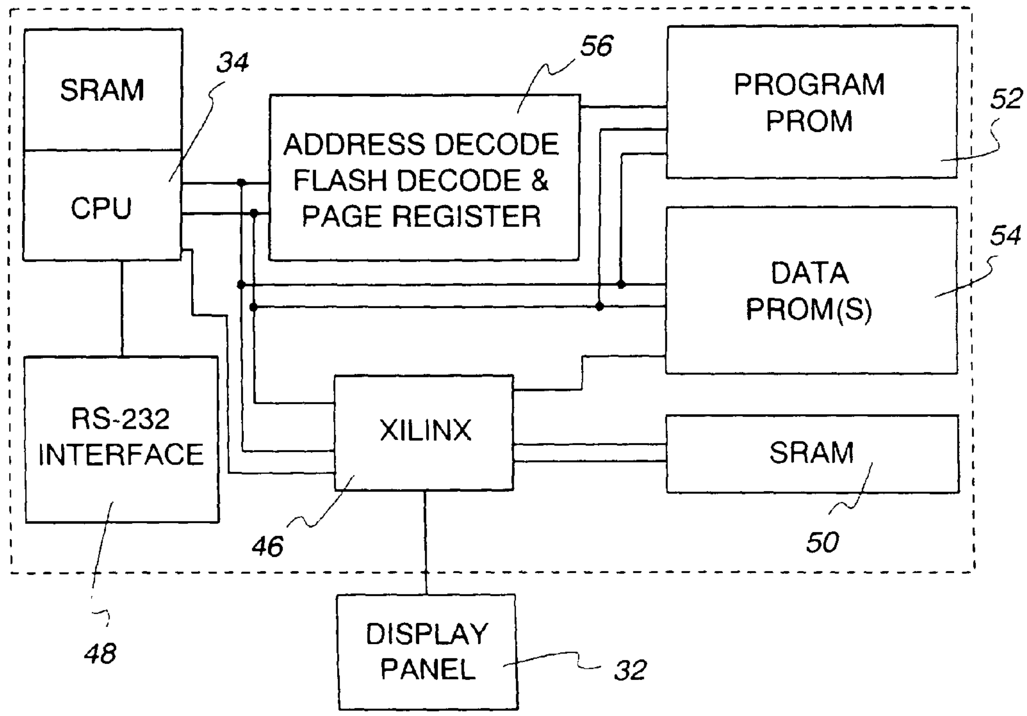
FIG. 13 is a block diagram of the display controller of FIG. 12.

In one embodiment, the display controller 36 takes the form shown in FIG. 13. This display controller 36 is based on a 68 HC11 processor 44 and uses a Xilinx 3030 field programmable gate array (FPGA) 46 to provide the logic for an RS-232 interface 48, an interface to external SRAM 50 and bank switching for program PROM 52 and data PROM(s) 54. The FPGA 46 controls the data flow to the display 32 and provides any required timing signals. Briefly, the FPGA 46 is operatively coupled, as indicated, with the display 32 and also with SRAM 50, PROM(s) 52, 54 and with CPU 34. An address decode, flash decode and page register 56 is also operatively coupled with the CPU 44 for addressing the PROM 52.

The program PROM 52 stores control software, intermediate instructions and data necessary to control operation of the display 32 in response to instructions from the CPU 34. The data PROM(s) 54 stores window values and data necessary to assign various values/outcomes to the grid 40 in bonus mode, as well as data relating to text printing, text banners, fonts, frames, sprites, frame animations and sprite animations to be displayed by the display 32 in bonus mode or attract mode. The PROM(s) 52 and 54 may comprise physically separate memory structures (e.g., stored on separate memory "chips") or may comprise functionally separate memories integrated on a single chip. As will be appreciated, the memory structures 52 and 54 may be comprised of any of several types or combinations of memories known in the art, including volatile or writable memories.

In one embodiment, the display 32 comprises a dot matrix display having 12,288 elements, including 64 rows of 192 "pixels." The pixels are separately actuatable, preferably at a rate of 25 full frames per second or more, to form a graphics display which may include, for example, animated characters, text or symbols. It will be appreciated, however, that the display 32 may comprise any of several alternative types of displays or modified forms of dot matrix displays. For example, the display 32 may comprise a CRT, LED, LCD or electro-luminescent display rather than a dot matrix display, or may comprise a dot-matrix display having fewer or greater numbers of pixels or a different arrangement of pixels than heretofore described. The display 32 may comprise a color or monochrome display. In an embodiment where the display 32 comprises a monochrome display, the pixels are preferably actuatable at three or more discrete intensity levels to emulate three or more shades of "gray."

Figure 14:
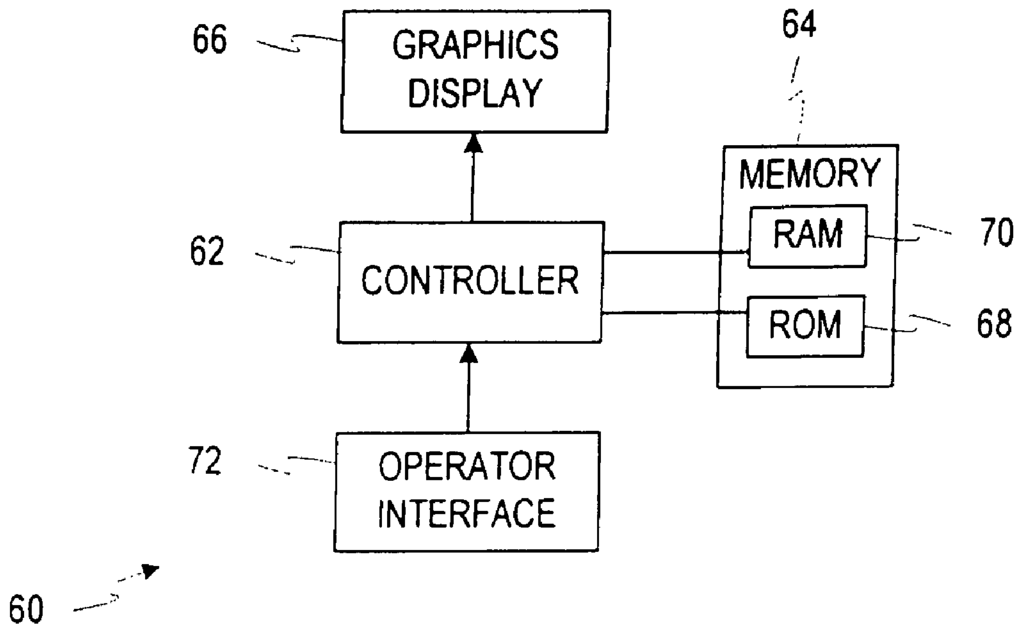
FIG. 14 is a block diagram of a video game machine on which the present invention may be implemented.

The display 32 is not limited to showing only the bonus game, but in some embodiments may be used to display both the basic game and bonus game. In other words, the basic game and bonus game may be implemented entirely in video in a gaming machine not having a mechanical spinning reel display. One such type of video game is illustrated in FIG. 14, designated generally by reference numeral 60. The video game 60 may comprise virtually any type and/or size of video game including, for example, coin operated video games, hand-held video games, microprocessor or PC-driven video games. The video game 60 includes a game controller 62 operably coupled to a memory unit 64 and a graphics display 66. The memory unit 64 stores control software, operational instructions and data associated with the video game 60.

In the illustrated embodiment, the memory unit 64 includes a read-only memory (ROM) 68 for storing a game code, graphics and audio associated with the video game 60 and a battery-backed random access memory (RAM) 70 for storing various operating instructions and data for operating the video game 60. The ROM memory 68 is non-volatile (e.g., its data content is preserved without requiring connection to a power supply) and is generally unalterable while it remains within the video game 60. The battery-backed RAM memory 70 is volatile but retains its data content as long as power is provided, either from an external power source or the battery back-up. The RAM memory 70 is alterable by the controller 62 when appropriate (e.g., in response to change in operational status of the video game 60). It will be appreciated that the memory unit 64 may be implemented on memory structures other than ROM and battery-backed RAM, or may be integrated on a single memory structure.

The game controller 62 controls play of the video game 60 responsive to player inputs provided through an operator interface 72. The game controller 62 may comprise a microcomputer, microprocessor or any other suitable device for executing control of the video game 60. The operator interface 72 may comprise any combination of push buttons, joysticks, keypads, touch-screens and the like. The game controller 62 executes control software in the memory 64 according to the player inputs and communicates the resulting video game activity including, for example, text, animations and background graphics to the graphics display 66. The graphics display 66 may comprise a CRT, LED, LCD, dot-matrix, electro-luminescent display or any other type of display known in the art.

In one embodiment, the operator interface 72 comprises a touch-screen electrically coupled to the display 66. Player inputs are provided by touching the touch screen 72 at touch points directly above various "keys" or key outlines or other specified areas on the display 66. The controller 62 may be programmed to display the various "keys" or key outlines (not shown) on the graphics display 66 and to recognize the locations of the "keys," key outlines, or other specified areas of the graphics display 66 according to control software in the ROM memory 68. The "keys" or key outlines, if used, may be displayed both during attract mode and during active play of the game. The "keys" may simulate the appearance of an actual key or may comprise game symbols and/or characters shown on the graphic display 66. For example, in a video game implementation of the JACKPOT PARTY™ bonus game, the key outlines may comprise areas of the display 66 on which the bonus game window(s) are displayed.

The touch screen (not shown) defines an X-Y matrix of touch responsive points positioned adjacent to and overlying the "keys" of the display 66. In one embodiment, the touchscreen comprises a ClearTek® capacitive touchscreen, commercially available from MicroTouch Systems, Inc., Methuen, Mass. It will be appreciated, however, that other types or models of touchscreens known in the art may be used. In the ClearTek® touch screen, voltage is applied to the four corners of the touch screen to create a uniform voltage field about the touch screen. When pressure from a finger or stylus is applied to a selected touch point of the touch screen, current is drawn from the sides of the touch screen in proportion to the distance of the touch point from the edge of the touch screen. A touch screen controller (not shown) evaluates the current flow to detect the coordinates of the touch point. The game controller 62 determines whether the touch point coincides with any "key(s)" on the underlying display 66 and, if so, performs a function or functions (e.g., a designated game activity) associated with that displayed "key." In the JACKPOT PARTY™ bonus game, for example, pressing the touch screen at a location directly above a displayed window causes the game controller 62 to "select" that window, to display the bonus game outcome associated with that window and award coin(s) or credit(s) as appropriate.

In a video game, pressing of a particular "key" generally causes the game controller 62 to trigger display of game activity on the graphic display 66. The game activity may cause the game controller 62 to periodically redefine key outlines, displays and/or functions associated with the game. For example, in the JACKPOT PARTY™ bonus game, the controller 62 initially causes key outlines associated with the various windows to initially "mask" or hide the game outcomes and, as a result of game activity, causes the windows to reveal the game outcome(s) associated with the selected window(s). Pressing the touch screen above the window outline while the window is "masked" will cause the controller 62 to perform a different function than it would perform if the window has been "unmasked" to display a particular game outcome.

Figure 15:
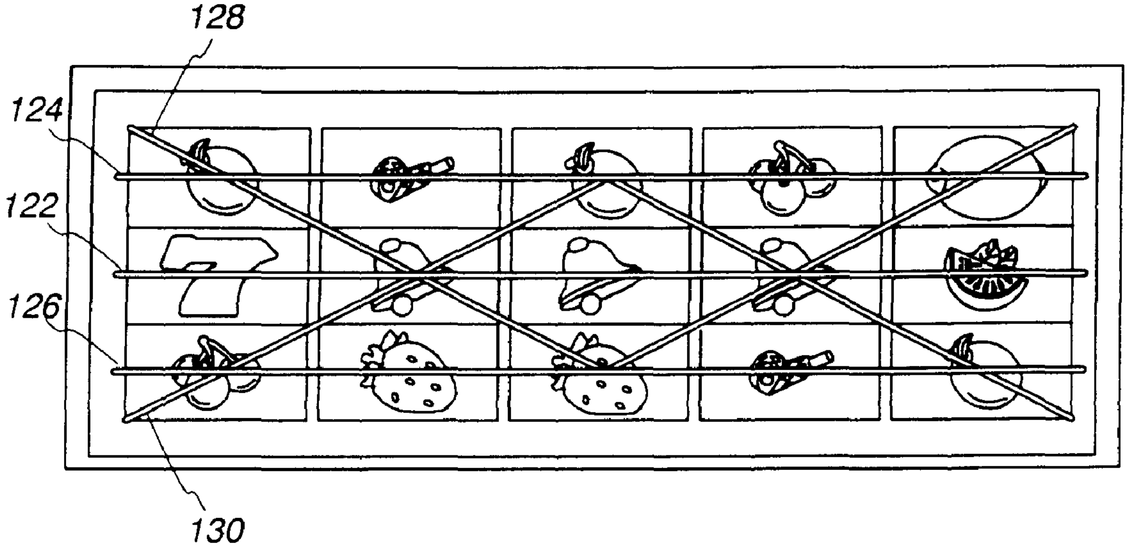
FIG. 15 is an illustration of five simulated reels associated with a basic game played on the video game machine of FIG. 14.

FIG. 15 depicts one embodiment of the JACKPOT PARTY™ game implemented on a video display 66. In this embodiment, the basic game is implemented with five animated "reels" 72, 74, 76, 78 and 80 which are set in "motion" by either pulling a lever (not shown) or depressing a push button (not shown) on the video game 60. The controller 62 then operates according to its game program to select a game outcome (e.g., "basic" game outcome) corresponding to a particular reel "stop position" and causes each of the reels 72, 74, 76, 78 and 80 to stop at the preselected stop position. The "stop" position of the reels is illustrated by various symbols in generally the same manner as in a mechanical slot machine game. Winning "basic" game outcomes (e.g., symbol combinations resulting in payment of coins or credits) are identifiable by a pay table (not shown) affixed to or displayed by the video game 60.

In the illustrated embodiment, there are five paylines 122, 124, 126, 128 and 130. In one embodiment, each of the paylines are "active" regardless of the number of coin(s) or credit(s) played. Any number from one to ninety coin(s) or credit(s) may be played. Winning combination(s) occur if any of the combinations appearing on a pay table are displayed directly under any of the active paylines. Paylines 122, 124 and 126 extend horizontally across the five reels 72, 74, 76, 78 and 80 in alignment with, respectively, consecutive center, upper and lower symbols on each reel. Payline 128 extends in a "V" pattern in alignment with the upper symbol of reel 72, center symbol of reel 74, lower symbol of reel 76, center symbol of reel 78 and upper symbol of reel 80. Payline 130 extends in an inverted "V" pattern in alignment with the lower symbol of reel 72, center symbol of reel 74, upper symbol of reel 76, center symbol of reel 78 and lower symbol of reel 80.

It will be appreciated, however, that alternative pay schemes may implemented. For example, in one embodiment of the present invention, a winning combination is defined by the game controller to occur when a special "start-bonus" symbol appears on any three consecutive reels in any of the three visible display positions (e.g., "top," "middle" or "bottom"), even though such positions do not correspond with an active pay line. Similar to the mechanical slot machine (FIG. 1), the appearance of such a combination of "start-bonus" symbols causes the game controller to shift operation from the basic game to a bonus game. In another embodiment, the game controller enters the bonus game upon the appearance of a special symbol combination on three consecutive reels which is not identified on the pay table. Because such combination is not identified on the pay table, it is a "start-bonus" combination which players will consider to be a losing combination and, accordingly, represents a surprise winning combination to the player. Alternatively or additionally, the occurrence of "start-bonus" symbols and/or combination(s) may cause the processor to award coin(s) or credit(s) in the basic game.

Like the mechanical slot machine (FIG. 1), the possible basic game outcomes may also include a special symbol combination (e.g., "bonus-resource" outcome) causing the game controller to generate a bonus game resource exercisable in the bonus game. The occurrence of "bonus-resource" outcome(s) may also cause the game controller to award coin(s) or credit(s) in the basic game. In one embodiment, the game controller continues to operate in the basic mode after the occurrence of a bonus-resource outcome. In this embodiment, any number of bonus-resource outcomes may occur through several repetitions of the basic game (causing the game controller to generate a corresponding number of bonus game resources) before entering the bonus mode, if at all, upon the occurrence of a start-bonus outcome. The bonus game resource(s) may comprise any item which operates to enhance the excitement and/or winning expectation in the bonus game. In one embodiment, for example, a bonus game resource is usable to override an otherwise undesired outcome of the bonus game. For example, in a bonus game including one or more "end-bonus" outcome(s) which would otherwise end the bonus game, a bonus game resource, if available, may be used to override the end-bonus outcome and thereby continue play of the bonus game. Another type of bonus game resource might be used as a multiplier (e.g., 2×, 5×, 10×, etc.) of coin(s) or credit(s) awarded in a bonus game. For example, a "5×" resource played in conjunction with a bonus game outcome awarding 5 coins or credits would result in an award of 25 coins or credits.

According to one embodiment, the video game uses symbols corresponding to those shown in FIG. 2, with 18 symbols per reel. In one embodiment, the payout rates, hit rates, total hits and total coins paid for the basic game increases directly in proportion to the numbers of coins played. Thus, if a particular combination will pay 20 coins or credits with one coin played, that same combination will pay 100 coins or credits with five coins played.

Like the basic game described in relation to FIG. 1, the video "basic" game also includes various basic game outcomes (e.g., special symbol combinations) which cause the game controller to shift operation from the basic game to a bonus game. In the video JACKPOT PARTY™ game, one such combination is characterized by the display of a "Party Favor" symbol on any three consecutive reels, in any display position, causing the game controller to enter a bonus game "party." Another special combination is characterized by the display of respective Jackpot 7, Orange and Special Lemon symbols in the center display position on any three consecutive reels, also causing the game controller to enter a bonus game "party." Both of these special symbol combinations represent a "start-bonus" outcome because they cause the game controller to shift operation from the basic game to a bonus game. The bonus game party entered in response to the Jackpot 7, Orange and Special Lemon combination is a "surprise party" because, since the Jackpot 7, Orange and Special Lemon symbols are not identified to the player (e.g., on the pay table) as winning combinations, it is an apparent losing combination and would not be expected to generate a bonus game and associated high winning expectation.

Like the bonus game described in relation to FIGS. 8 and 9, the video "bonus" game is displayed on a 6×5 rectangular grid consisting of thirty selection elements or "windows," each associated with a particular bonus game outcome. The outcomes consist of various numerical outcomes (such as, for example, coin/credit award amounts) and various non-numerical outcomes (such as, for example, "end-bonus" outcomes). The various type(s) of outcomes and the values of the numerical outcomes are predetermined by the game program according to the type of bonus game which is being played (and, in one embodiment, according to the number of coins or credits played) but the placement of the outcomes in the grid (e.g., the determination of which selection elements are to be associated with the various outcomes) is randomly determined by the game controller. Arrangement of the various outcomes, once determined, remains fixed for the duration of the bonus game. The arrangement of outcomes is reaccomplished, however, upon subsequent plays of the bonus game so that each individual bonus game will generally have a unique arrangement of outcomes in the grid.

Upon initial play of the bonus game, the windows are masked as shown in FIG. 8 so as to "hide" the various outcomes corresponding to the windows. As play begins, the player is prompted to select one of the thirty windows. In a touch-screen embodiment of the video game, selection of the window is accomplished by the player touching the screen in an area directly over the desired window. Upon selection of a window, the game controller causes the outcome associated with the selected window to be revealed on the display. Unselected windows remain masked so as to continue to "hide" their respective outcomes. Coin(s) or credit(s) are awarded as appropriate, corresponding to the selected outcome.

In an embodiment including "end-bonus" outcomes, the selection of an end-bonus outcome causes the game controller to end the bonus game. Otherwise, the selection of any other outcome causes the controller to prompt the player to make other selection(s), one at a time, until an end-bonus outcome is selected. In one embodiment, upon selection of an end-bonus outcome, the player is permitted to exercise or "play" a bonus game resource (which may comprise, for example, a "GET OUT OF JAIL FREE" card in a MONOPOLY™-based game), if such resource has been obtained in the basic game, to overcome an end-bonus game outcome and continue play of the bonus game. If no such bonus resources are available, the bonus game is ended upon the selection of an end-bonus game outcome. When the bonus game has ended, the outcomes associated with the entire grid are revealed, as discussed in relation to FIG. 9.

One embodiment of the video "bonus" game comprises a JACKPOT PARTY™ game substantially similar to the game described in relation to FIGS. 8 and 9, in which 24 of the tiles are associated with an award of coin(s) or credit(s) and 6 of the tiles are associated with end-bonus outcome. The particular arrangement of the tiles is unique to each play of the bonus game. Thus, for example, the particular arrangement of FIG. 9, with PARTY POOPER symbols displayed in windows 101, 105, 108, 114, 117 and 130, is not likely to be repeated in any other bonus game.

In one embodiment, after completion of the bonus game, the game controller causes the entire grid to be displayed for a few seconds, then restores the screen to show only the selected windows, then pays out the win total associated with the selected windows. The win total in the JACKPOT PARTY™ bonus game is the sum of the selected "coin" symbol awards plus one coin for the PARTY POOPER symbol for each coin played, which may be up to 90 coins in the video game embodiment. Generally, in an n-coin game, the PARTY POOPER symbol will result in an award of n coins or credits. The award of coin(s) for the PARTY POOPER symbol assures a winning outcome in the bonus game even if the PARTY POOPER symbol is the first (and last) selection in the game. After payment of the award, the display screen in one embodiment will display an attract mode animation until the next bonus game is commenced.

In one embodiment, the normalized win amounts associated with the various windows are the same regardless of the number of coins played. Thus, the normalized average bonus also remains the same for any number of coins or credits played. This is in contrast to the embodiment discussed in relation to FIG. 10, in which the window values differ (and in which the normalized average bonus decreases) in relation to the number of coins played. In the video version, where multiple coins or credits are played, the actual average bonus value is computed by multiplying the normalized average bonus by the number of coins played.

Specifically, in one embodiment of the JACKPOT PARTY™ video game, the normalized win amounts in the 24 non-POOPER windows are 1 (2 occurrences), 2 (5 occurrences), 3 (1 occurrence), 4 (1 occurrence), 5 (9 occurrences), 10 (3 occurrences), 15 (2 occurrences) and 20 (1 occurrence). The average (non end-bonus) normalized window value is therefore 6.0, regardless of the number of coins played. The actual win amounts available for the various games may be computed by multiplying the respective normalized win amounts by the number of coins played. Thus, for example, the actual win amounts with 2 coins played are 2 times that of the normalized win amounts, the actual win amounts with 3 coins played are 3 times that of the normalized win amounts, and so on.

For any given number of coins played, the corresponding actual win amounts are randomly assigned to non-POOPER windows and are available for selection in the bonus game. Arrangement of the various win amounts, once determined, remains fixed for the duration of the bonus game. The arrangement of win amounts and POOPER windows is reaccomplished, however, upon subsequent plays of the bonus game so that each individual bonus game will generally have a unique arrangement of outcomes in the grid.

The various possible bonus game outcomes in the JACKPOT PARTY™ video game correspond generally to the outcomes identified in FIG. 11. As discussed in relation to FIG. 11, the number of possible successful choices in the bonus game ranges from 0 to 24. The "% end" and "% safe" values for the various choices in the JACKPOT PARTY™ video game are identical to those identified in FIG. 11. The "Pays" and "EV" values for the video game are computed in the same manner as those identified in FIG. 11 but will differ therefrom because of different average window values in the respective games.

Similarly, for multi-coin games (up to 90 coins in the video embodiment), the numbers of choices, "% end" and "% safe" values will again be identical to that of FIG. 11 but the "Pays" and "EV" values will differ because of the different average window values and different PARTY POOPER values of the multi-coin games.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a wagering game at a gaming terminal having an input device and at least one display, comprising:

receiving a wager input via said input device;

conducting a basic game until a start-bonus outcome is achieved, said conducting including displaying, on said at least one display, a set of basic-game symbols that are indicative of outcomes in said basic game;

in response to said start-bonus outcome, terminating said displaying of said set of said basic-game symbols;

in response to said start-bonus outcome, displaying selectable elements fixedly associated with respective award indicia for a bonus game, said selectable elements being distinct from said set of basic-game symbols in said basic game, said award indicia for at least one of said selectable elements having a monetary value, said award indicia for at least one of said selectable elements being a stop-bonus-game symbol;

providing a bonus-game award associated with said selected ones of said selectable elements; and after said stop-bonus-game symbol is selected, revealing said award indicia associated with unselected ones of said selectable elements, thereby permitting a player to view said award indicia that were not achieved in said bonus game.

2. The method of claim 1, wherein said basic game includes a plurality of video reels bearing said basic-game symbols.

3. The method of claim 2, wherein said video reels are removed from a video display on which said video reels are displayed and said bonus game is then presented on said display.

4. The method of claim 1, wherein said bonus-game award is a monetary award.

5. The method of claim 4, wherein said bonus-game award is independent of any basic-game award.

6. The method of claim 1, wherein said monetary value is in wagering-game credits.

7. The method of claim 1, further including, prior to said revealing step, selecting said selected ones of said selectable elements by a player.

8. The method of claim 7, wherein said selecting is performed by use of a touch screen.

9. The method of claim 1, wherein said bonus game does not result in a loss of any basic-game award that has been achieved prior to the bonus game.

10. A method of conducting a wagering game at a gaming terminal having an input device and at least one display, comprising:

receiving a wager input via said input device;

conducting a basic game until a start-bonus outcome is achieved, said conducting including displaying, on said at least one display, basic-game symbols that are indicative of outcomes in said basic game;

providing basic-game awards for winning outcomes in said basic game;

in response to said start-bonus outcome, displaying a plurality of selectable elements fixedly associated with respective award indicia for a bonus game, said plurality of selectable elements being distinct from said basic-game symbols displayed in said basic game, said award indicia for at least one of said plurality of selectable elements having a monetary value, said award indicia for at least one of said plurality of selectable elements being a stop-bonus-game symbol;

receiving player-inputs for selected ones of said plurality of selectable elements;

after said receiving said player-inputs for selected ones of said plurality of selectable elements, revealing said award indicia associated with unselected ones of said plurality of selectable elements, thereby permitting a player to view said award indicia that were not achieved in said bonus game; and awarding a bonus-game award that is based on said selected ones of said plurality of selectable elements said bonus-game award being independent of any of said basic-game awards.

11. The method of claim 10, wherein said receiving said player inputs is performed by use of a touch screen.

12. The method of claim 10, wherein said plurality of selectable elements are arranged in a multi-row and multi-column array.

13. The method of claim 10, wherein said revealing said award indicia associated with unselected ones of said plurality of selectable elements occurs in response to receiving a player input of a selectable element with an award indicia having said stop-bonus-game symbol.

14. A gaming machine for conducting a wagering game feature, comprising:

at least one display; and a processor coupled to said at least one display and operative to instruct said at least one display to display a symbol combination selected from a plurality of basic-game symbols for indicating an outcome of a basic game;

in response to a start-bonus outcome being achieved in said basic game, instruct said at least one display to display a plurality of player-selectable elements fixedly associated with respective award indicia, said plurality of player-selectable elements being distinct from said plurality of basic-game symbols that were displayed in said basic game, said award indicia for at least one of said plurality of player selectable elements being a stop-bonus game element;

receive player inputs of one or more of said plurality of player-selectable elements;

instruct said display to reveal said award indicia associated with selected ones of said plurality of player-selectable elements;

after said stop-bonus game element is selected, instruct said at least one display to reveal said award indicia associated with unselected ones of said plurality of selectable elements; and award a bonus-game award associated with said selected ones of said plurality of player-selectable elements.

15. The machine of claim 14, wherein said basic game includes a plurality of reels bearing said basic-game symbols, said reels being rotated and stopped to place said symbol combination in visual association with a display area on said at least one display.

16. The machine of claim 14, wherein said bonus-game award is independent of any basic-game award.

17. The machine of claim 14, wherein said award indicia includes a multiplier value.

18. The machine of claim 14, wherein said bonus game does not result in a loss of any basic-game award that has been achieved prior to the bonus game.

* * * * *